(12) United States Patent
Ueda et al.

(10) Patent No.: US 12,447,622 B2
(45) Date of Patent: Oct. 21, 2025

(54) ARTICLE CONVEYANCE PROCESSING SYSTEM

(71) Applicant: JAPAN CASH MACHINE CO., LTD., Osaka (JP)

(72) Inventors: Takashi Ueda, Osaka (JP); Yoshiaki Uemizo, Osaka (JP); Tomonori Kitano, Osaka (JP); Shin Iose, Osaka (JP); Kazuyoshi Nakatani, Osaka (JP); Yoshimi Ezawa, Osaka (JP)

(73) Assignee: Japan Cash Machine Co., Ltd. (JP)

( * ) Notice: Subject to any disclaimer, the term of this patent is extended or adjusted under 35 U.S.C. 154(b) by 114 days.

(21) Appl. No.: 18/572,102

(22) PCT Filed: Feb. 9, 2022

(86) PCT No.: PCT/JP2022/005172
§ 371 (c)(1),
(2) Date: Dec. 19, 2023

(87) PCT Pub. No.: WO2023/276236
PCT Pub. Date: Jan. 5, 2023

(65) Prior Publication Data
US 2024/0286289 A1 Aug. 29, 2024

(30) Foreign Application Priority Data
Jun. 30, 2021 (JP) .................. 2021-108378

(51) Int. Cl.
*B25J 13/08* (2006.01)
*B25J 9/00* (2006.01)
(Continued)

(52) U.S. Cl.
CPC .......... *B25J 9/1687* (2013.01); *B25J 9/0027* (2013.01); *B25J 9/1697* (2013.01); *B25J 13/089* (2013.01); *B25J 15/0616* (2013.01)

(58) Field of Classification Search
CPC ...... B25J 9/1687; B25J 9/0027; B25J 9/1697; B25J 13/089; B25J 15/0616; G05D 1/00
See application file for complete search history.

(56) References Cited

U.S. PATENT DOCUMENTS 11,511,417 B1 * 11/2022 Meiswinkel ........... B25J 13/088
11,591,168 B2 * 2/2023 Diankov .............. B65G 47/905
(Continued)

FOREIGN PATENT DOCUMENTS

| JP | 2018089719 A | 6/2018 |
| WO | 0113581 A1 | 9/2016 |
| WO | 2016135861 A1 | 9/2016 |

OTHER PUBLICATIONS

International Search Report for PCT/JP2022/005172 dated May 10, 2022.

*Primary Examiner* — Dalena Tran
(74) *Attorney, Agent, or Firm* — FisherBroyles, LLP; Rob L. Phillips

(57) ABSTRACT

Provided is an article conveyance processing system in which article(s) are efficiently taken out from a mobile cart and/or article(s) are placed on a mobile cart even when various types of mobile carts are used. Using the cart coordinate system obtained such that the horizontal, vertical and depth axes of the cart coordinate system substantially coincide with the horizontal, vertical and depth directions of the mobile cart, respectively, the article conveyance processing system performs the control of moving the robot hand and the attitude control of the robot hand; thus, the article conveyance processing system can efficiently take out an article from a mobile cart and/or place an article on a mobile cart regardless of in what orientation a wide variety of mobile carts are placed.

8 Claims, 28 Drawing Sheets

(51) Int. Cl.
*B25J 9/16* (2006.01)
*B25J 15/06* (2006.01)

(56) References Cited

U.S. PATENT DOCUMENTS

| | | |
|---|---|---|
| 12,214,975 B2 * | 2/2025 | Pidaparthi .............. B25J 9/1697 |
| 12,311,551 B2 * | 5/2025 | Arase ..................... B25J 9/1687 |
| 2014/0341695 A1 | 11/2014 | Girtman et al. |
| 2019/0193956 A1 * | 6/2019 | Morland ................ B65G 57/03 |
| 2020/0357228 A1 | 11/2020 | Pechinko |

\* cited by examiner

ARTICLE CONVEYANCE PROCESSING SYSTEM

TECHNICAL FIELD

The present invention relates to a technique for controlling an article conveyance apparatus that takes out article(s) from a shelf or the like and/or places article(s) on the shelf or the like.

BACKGROUND ART

In recent years, in a warehouse or the like provided with a shelf for storing a plurality of articles, an article conveyance robot has been developed to efficiently take out an article from the shelf or place an article on the shelf. For example, Patent Document 1 discloses an article conveyance robot in which a robot hand capable of moving a suction portion back and forth using a parallel link mechanism is connected to a robot arm.

PRIOR ART DOCUMENTS

Patent Document 1: Japanese Patent Application Publication No. 2018-89719

DISCLOSURE OF INVENTION

Technical Problem

In a warehouse or the like provided with a shelf for storing a plurality of articles, the shelf is usually fixed, and the article can be taken out from the shelf or the article can be placed on the shelf using an article conveyance robot as disclosed in the above-mentioned prior art document. In other words, when the shelf is fixed, the article conveyance robot can predict, to some extent, a position where the article is placed, and thus it is relatively easy to know how to operate the article conveyance robot to take out the article from the shelf or to place the article on the shelf; as a result, the article conveyance robot can take out the article from the shelf (fixed shelf) or place the article on the shelf (fixed shelf).

However, in a case where the shelf is not fixed and it is not possible to know in advance what direction the shelf is placed at what position, it is necessary to perform extremely complicated control processing on the article conveyance robot to have the article conveyance robot take out the article placed on the shelf or place the article on the shelf.

For example, a cart (shelf) on which cash boxes are placed and transported in a casino or the like is a mobile cart; the cart is transported to a predetermined location (for example, a room for collecting cash boxes), and an operation of collecting the cash boxes loaded on the cart is performed at the location. Such carts (mobile shelves) are often carried by a person, and it is not known what the position and orientation of the cart is when the cart has been moved to a predetermined location for retrieving the cash boxes. This makes it difficult to efficiently retrieve the cash boxes from the cart using conventional technology.

Also, in casinos and the like, carts (e.g., Box Cart, mobile shelves) for transporting cash boxes for bill validators that have been manufactured by many manufacturers are used. Further, the number of game machines installed in one casino varies from several tens to several thousands, and thus the size and number of carts (carts for transporting cash boxes) used by the game machines vary, and various types of carts (carts for transporting cash boxes) are used.

In such a situation, it is difficult to efficiently retrieve cash boxes from various types of mobile carts using conventional technology.

In view of the above problems, an object of the present invention is to provide an article conveyance processing system in which articles are efficiently taken out from a shelf or the like (for example, a mobile cart) and/or articles are placed on a shelf or the like (for example, a mobile cart) even when various types of mobile carts are used.

Solution to Problem

To solve the above problems, a first aspect of the present invention provides a conveyance processing system for taking out an article from a mobile cart having a horizontal frame and a vertical frame and/or conveying and placing an article on the mobile cart, including a robot hand that grips and conveys an article, a movement mechanism that performs attitude control and movement control of the robot hand, and a control unit that controls the robot hand and the movement mechanism.

The robot hand includes a frame, a telescopic mechanism, an adsorption mechanism, a first distance sensor, a second distance sensor, and an imaging unit that are installed in the frame.

The control unit performs:
a first distance obtaining step of measuring a distance between a first measurement point on a horizontal frame of the mobile cart and the first distance sensor by the first distance sensor in a state in which the robot hand is attitude-controlled to have a predetermined attitude with respect to the mobile cart, and obtaining the measured value as a first distance;
a second distance obtaining step of, in a state of controlling the attitude of the robot hand in the same attitude as the predetermined attitude, measuring a distance between the first measurement point on the horizontal frame of the mobile cart and a second measurement point different from the first measurement point, and obtaining the measured value as a second distance;
a horizontal error determination step of determining whether a difference between the first distance and the second distance is equal to or less than a predetermined value;
a cart coordinate system horizontal axis setting step of, when it is determined that the difference between the first distance and the second distance is equal to or less than a predetermined value in the horizontal error determination step, setting an axis in substantially the same direction as a vector from the position of the robot hand when the first distance has been measured to the position of the robot hand when the second distance has been measured as a horizontal axis of the cart coordinate system that is a coordinate system used as references when controlling the movement and/or attitude for the mobile cart by the robot hand; and
a robot hand control step of controlling the robot hand based on the cart coordinate system.

Using the cart coordinate system obtained such that the horizontal axis of the cart coordinate system substantially coincides with the horizontal direction (the longitudinal direction of the horizontal frame) of the mobile cart, the article conveyance processing system performs the control of moving the robot hand and the attitude control of the robot hand; thus, the article conveyance processing system can efficiently take out an article from a shelf or the like (e.g., a mobile cart) and/or place an article on a shelf or the like (e.g., a mobile cart) regardless of in what orientation a wide variety of mobile carts are placed.

A second aspect of the present invention provides the conveyance processing system of the first aspect of the present invention in which the control unit further performs:
- a third distance obtaining step of measuring a distance between a third measurement point on the vertical frame of the mobile cart and the first distance sensor by the first distance sensor in a state in which the robot hand is attitude-controlled to have a predetermined attitude with respect to the mobile cart, and obtaining the measured value as a third distance;
- a fourth distance obtaining step of measuring a distance between a fourth measurement point, which is different from the third measurement point, on the vertical frame of the mobile cart and the first distance sensor by the first distance sensor in a state of controlling the attitude of the robot hand in the same attitude as in the third distance obtaining step, and obtaining the measured value as a fourth distance;
- a vertical error determination step of determining whether a difference between the third distance and the fourth distance is equal to or less than a predetermined value; and
- a cart coordinate system vertical axis setting step of, when it is determined that the difference between the third distance and the fourth distance is equal to or less than a predetermined value in the vertical error determination step, setting an axis in substantially the same direction as a vector from the position of the robot hand when the third distance has been measured to the position of the robot hand when the fourth distance has been measured as a vertical axis of the cart coordinate system that is a coordinate system used as references when controlling the movement and/or attitude for the mobile cart by the robot hand.

Using the cart coordinate system obtained such that the horizontal and vertical axes of the cart coordinate system substantially coincide with the horizontal (the longitudinal direction of the horizontal frame) and vertical directions (the longitudinal direction of the vertical frame) of the mobile cart, respectively, the article conveyance processing system performs the control of moving the robot hand and the attitude control of the robot hand; thus, the article conveyance processing system can efficiently take out an article from a shelf or the like (e.g., a mobile cart) and/or place an article on a shelf or the like (e.g., a mobile cart) regardless of in what orientation a wide variety of mobile carts are placed.

A third aspect of the invention provides the article conveyance processing system of the first or second aspect of the invention in which the control unit further performs a cart coordinate system depth axis setting step of setting an axis in a direction substantially orthogonal to both of a horizontal axis and a vertical axis of the cart coordinate system as a depth axis of the cart coordinate system.

Using the cart coordinate system obtained such that the horizontal (e.g., y-axis), vertical (e.g., z-axis), and depth (e.g., z-axis) axes of the cart coordinate system substantially coincide with the horizontal (the longitudinal direction of the horizontal frame), vertical (the longitudinal direction of the vertical frame), and depth (a direction approximately orthogonal to both the longitudinal direction of the horizontal frame and the longitudinal direction of the vertical frame) directions of the mobile cart, respectively, the article conveyance processing system performs the control of moving the robot hand and the attitude control of the robot hand; thus, the article conveyance processing system can efficiently take out an article from a shelf or the like (e.g., a mobile cart) and/or place an article on a shelf or the like (e.g., a mobile cart) regardless of in what orientation a wide variety of mobile carts are placed.

A fourth aspect of the present invention provides the article conveyance processing system of one of the first to the third aspects of the present invention in which the control unit analyzes a captured image of the identification information mark affixed on the vertical frame or the horizontal frame of the mobile cart, which has been obtained by imaging the identification information mark by the imaging unit, to obtain information included in the identification information mark.

This allows the article conveyance processing system to identify the mobile cart by the identification information mark and to appropriately perform article conveyance processing even when a wide variety of mobile carts are used.

A fifth aspect of the present invention provides the article conveyance processing system of one of the first to the third aspects of the present invention in which the control unit further performs a cart coordinate system origin setting step of setting a predetermined position of an identification information mark affixed on the vertical frame or the horizontal frame of the mobile cart to an origin of the cart coordinate system.

This allows the article conveyance processing system to set the predetermined position of the identification information mark as the origin of the cart coordinate system.

A sixth aspect of the present invention provides the article conveyance processing system of one of the first to the fifth aspects of the present invention in which the control unit further performs:
- a movement step of, when an article is to be taken out from a predetermined shelf of the mobile cart or an article is to be placed, taking out the article from the predetermined shelf or moving the article to a position where the article can be taken out from the predetermined shelf or be placed using the robot hand takes out while performing the attitude control of the robot hand;
- a detecting step of analyzing a captured image of the vertical frame supporting the predetermined shelf, which has been obtained by imaging the vertical frame by the imaging unit moved to a predetermined position in the movement step, to detect an inclination of the horizontal frame; and
- an attitude adjustment step of, when the inclination of the horizontal frame is larger than a predetermined value, adjusting the attitude control of the robot hand so as to correct the inclination.

Thus, even when a predetermined shelf of the mobile cart is distorted, the attitude of the robot hand is controlled in accordance with the distortion, thereby making it possible to appropriately perform the process of taking out an article from the predetermined shelf of the mobile cart or placing an article.

A seventh aspect of the present invention provides the article conveyance processing system of one of the first to the sixth aspects of the present invention in which the mobile cart has a reference mark, which is for specifying a center position when the article is to be placed in a row on the horizontal frame, for each row for arranging articles in a row.

The control unit, based on the reference mark, moves the robot hand while performing the attitude control of the robot hand, thereby performing the robot hand control step.

This allows for performing the movement control of the robot hand, the attitude control of the robot hand, the fine adjustment of the attitude control, or the like on the basis of the reference mark attached to the horizontal frame in the mobile cart.

An eighth aspect of the present invention provides the article conveyance processing system of one of the first to the seventh aspects of the present invention in which the control unit further performs:

a section setting step of, when an article is to be taken out from a predetermined shelf of the mobile cart, measuring a distance to the article by using the second distance sensor, and setting a high-speed movement section that is a section for controlling the suction mechanism attached to the telescopic mechanism to move at high speed, and a low-speed movement section that is a section for controlling the suction mechanism to move at low speed while monitoring a suction state of a suction portion of the suction mechanism attached to the telescopic mechanism; and a telescopic mechanism control step of controlling the telescopic mechanism so that the suction mechanism attached to the telescopic mechanism moves at high speed in the high-speed movement section set in the section setting step, and controlling the telescopic mechanism so that the suction mechanism moves at low speed while monitoring a suction state of the suction portion of the suction mechanism attached to the telescopic mechanism in the low-speed movement section set in the section setting step.

This allows the article conveyance processing system to performs the control of moving the suction portion attached to the suction mechanism at high speed in the high-speed movement section, and to moving the suction mechanism in the low-speed movement section while monitoring the suction state of the suction portion of the suction mechanism. As a result, in the article conveyance processing system, the total time for moving the suction mechanism to an article can be shortened, and the suction state for the article can be reliably detected.

Advantageous Effects

The present invention provides an article conveyance processing system in which articles are efficiently taken out from a shelf or the like (for example, a mobile cart) and/or articles are placed on a shelf or the like (for example, a mobile cart) even when various types of mobile carts are used.

DESCRIPTION OF EMBODIMENTS

First Embodiment

A first embodiment will now be described with reference to the drawings.

1.1: Configuration of Article Conveyance Processing System

Figure 1:
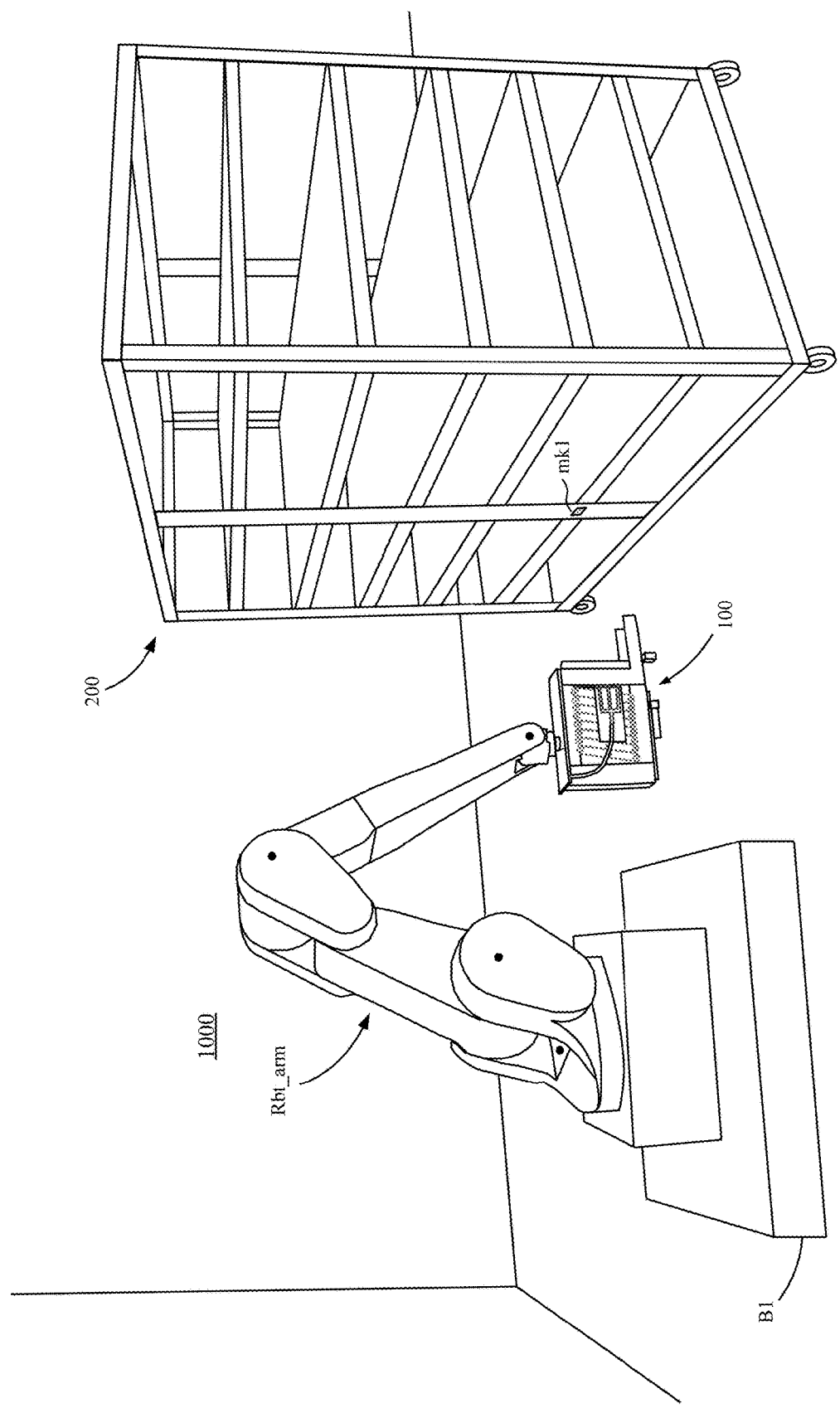
FIG. 1 is a diagram showing a schematic configuration of an article conveyance processing system 1000 according to a first embodiment.

FIG. 1 is a diagram showing a schematic configuration of an article conveyance processing system 1000 according to a first embodiment.

Figure 2:
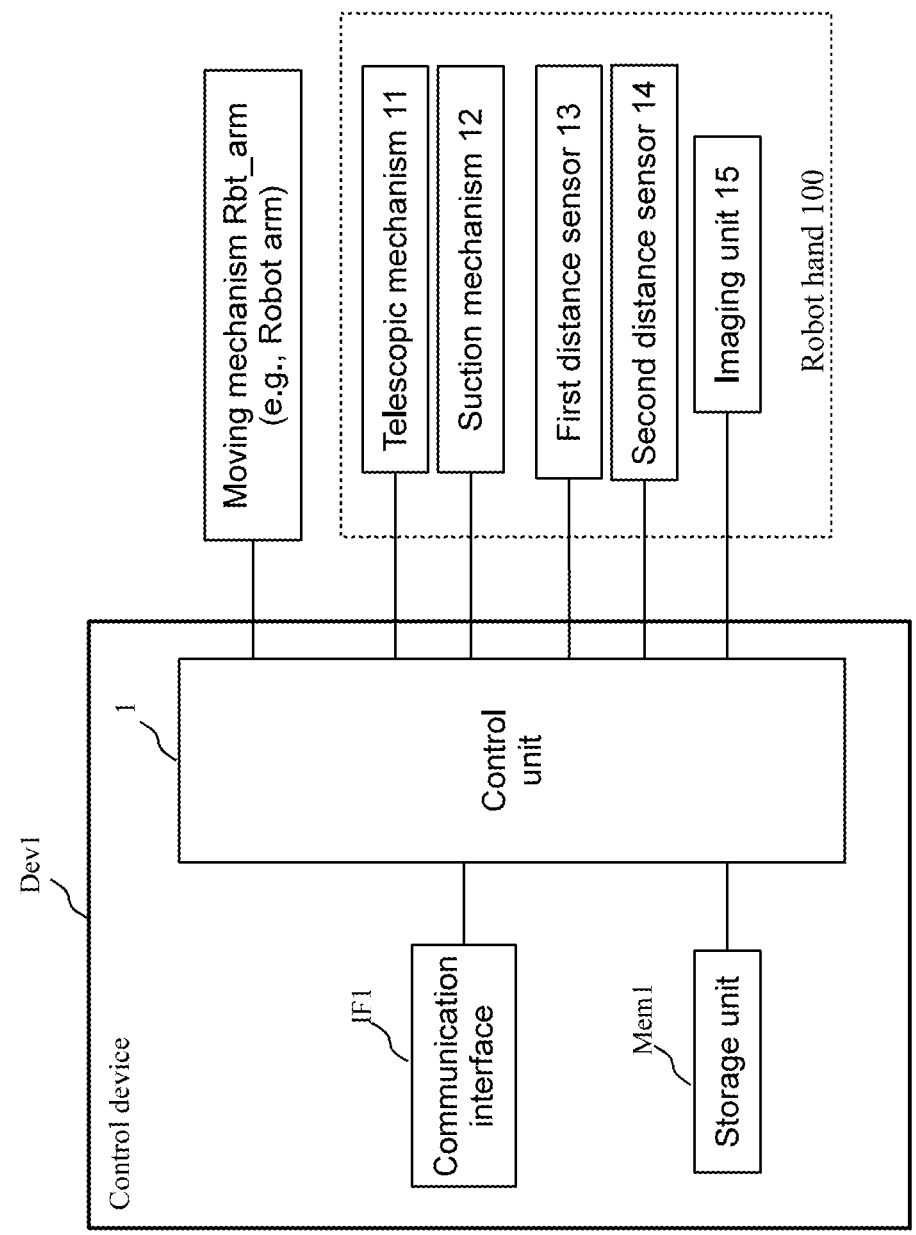
FIG. 2 is a diagram showing a functional configuration of the article conveyance processing system 1000 according to the first embodiment.

FIG. 2 is a diagram showing a functional configuration of the article conveyance processing system 1000 according to the first embodiment.

Figure 3:
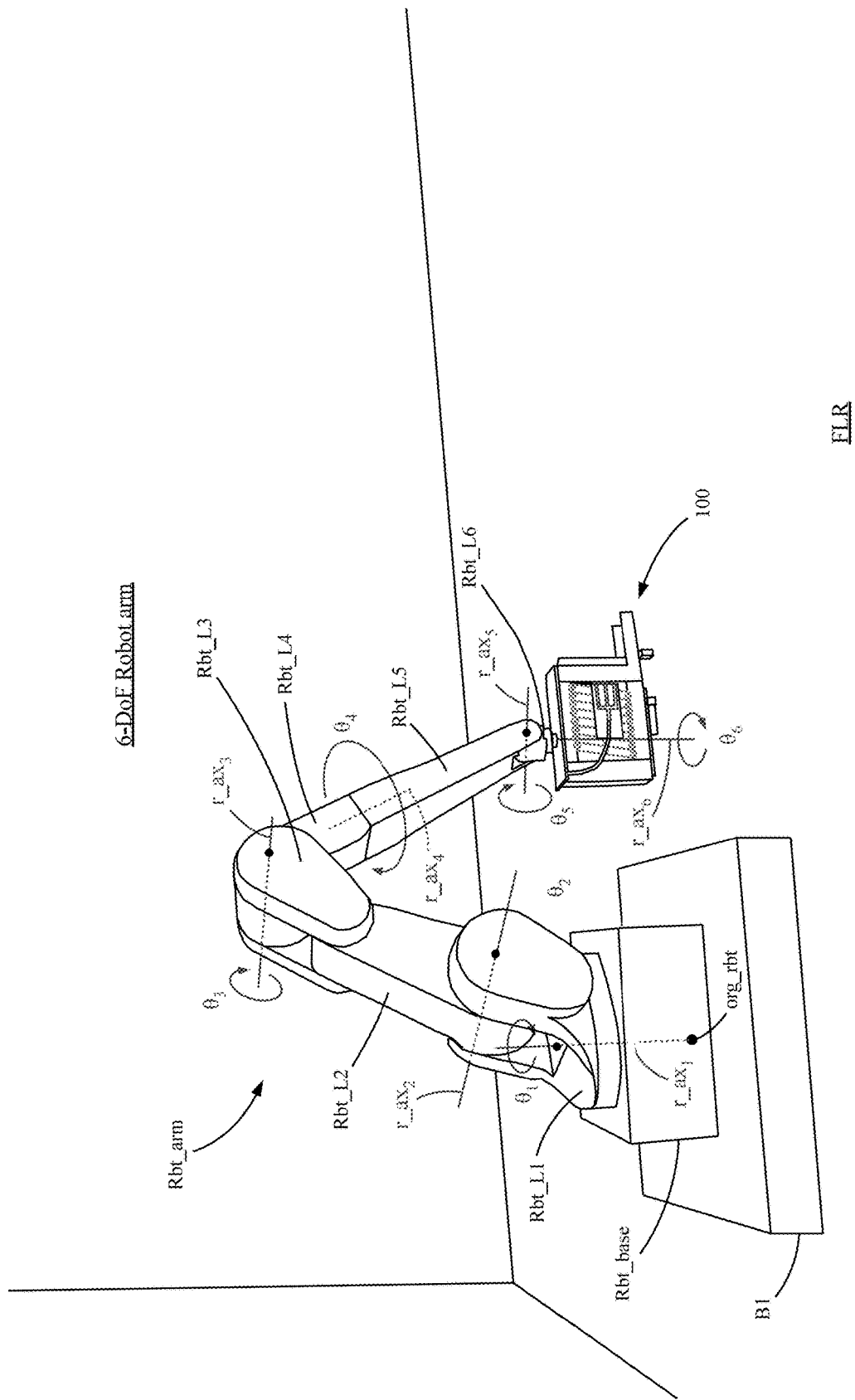
FIG. 3 is a diagram showing a schematic configuration of a moving mechanism Rbt_arm and a robot hand 100 according to the first embodiment, and showing rotation axes of individual links of the moving mechanism Rbt_arm and rotation axes (three axes corresponding to a yaw axis, a pitch axis, and a roll axis) for attitude control of the robot hand 100.

FIG. 3 is a diagram showing a schematic configuration of a moving mechanism Rbt_arm and a robot hand 100 according to the first embodiment, and showing rotation axes of individual links of the moving mechanism Rbt_arm and rotation axes (three axes corresponding to a yaw axis, a pitch axis, and a roll axis) for attitude control of the robot hand 100.

Figure 4B:
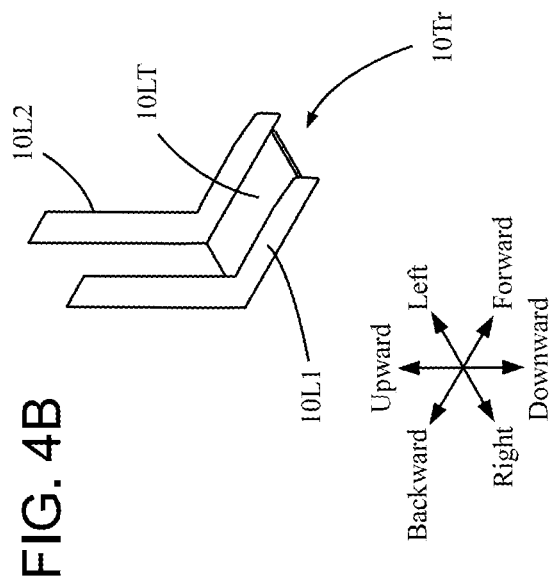
FIG. 4 is a diagram showing a schematic configuration of the robot hand 100 according to the first embodiment.
Figure 4A:
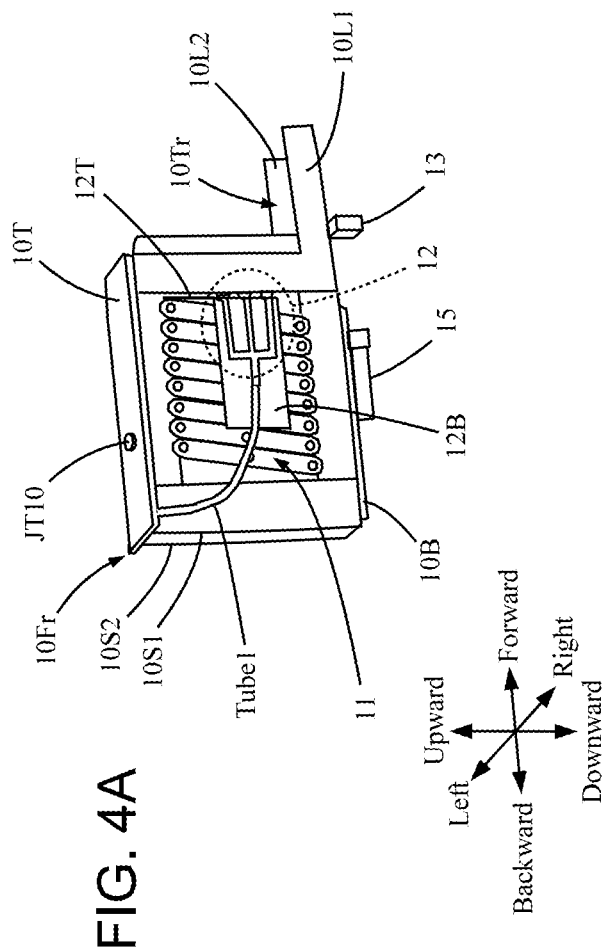
Figure 4C:
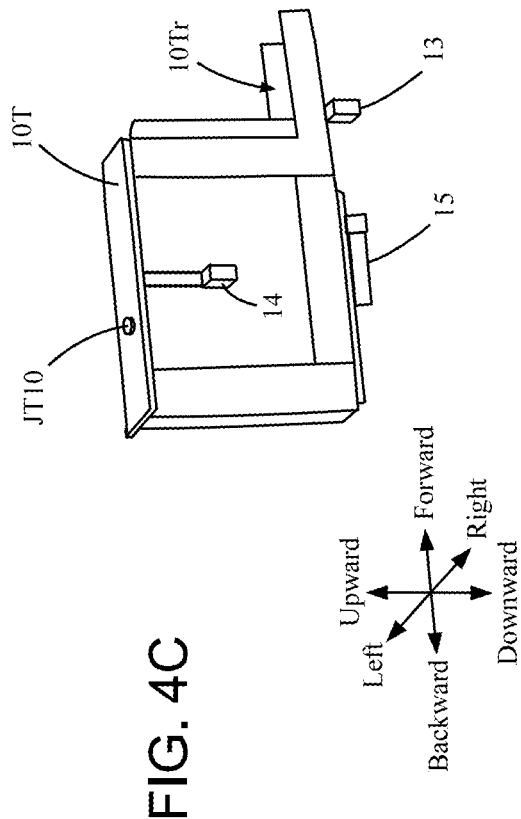

FIG. 4 is a diagram showing a schematic configuration of the robot hand 100 according to the first embodiment. Specifically, FIG. 4A is a diagram (perspective view) showing a schematic configuration of the robot hand 100; FIG. 4B is a diagram (perspective view) showing a schematic configuration of a placing portion 10Tr of the robot hand 100. FIG. 4C is a diagram (perspective view) showing the robot hand 100 with a telescopic mechanism 11 and a suction mechanism 12 omitted. In addition, the forward, backward, upward, downward, right, and left directions shall be defined as shown in FIGS. 4A to 4C.

Figure 5A:
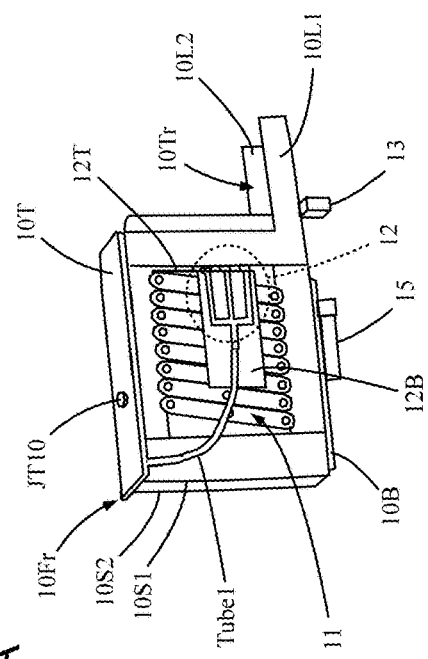
FIG. 5 is a diagram showing a schematic configuration of the robot hand 100 according to the first embodiment, and is a diagram for explaining attitude control of the robot hand 100.
Figure 5B:
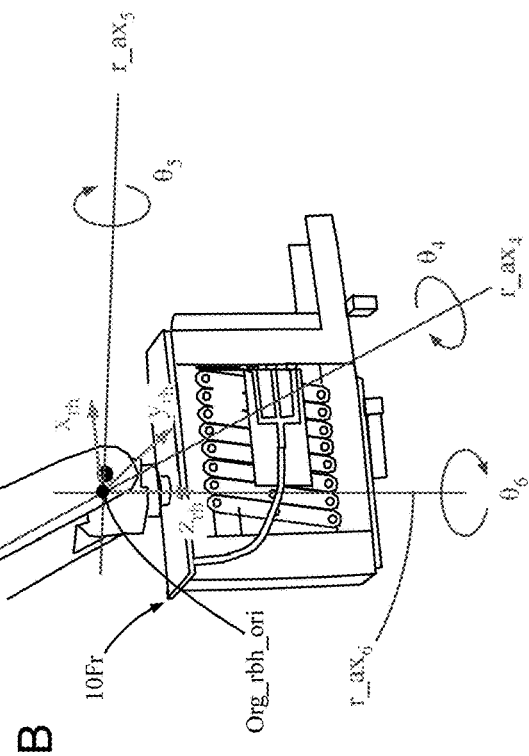
Figure 5C:
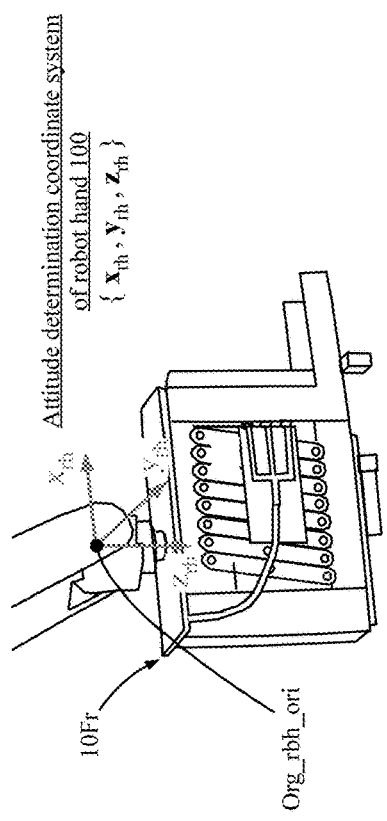

FIG. 5 is a diagram showing a schematic configuration of the robot hand 100 according to the first embodiment, and is a diagram for explaining attitude control of the robot hand 100. In addition, the forward, backward, upward, downward, right, and left directions shall be defined as shown in FIGS. 5A to 5C.

Figure 6:
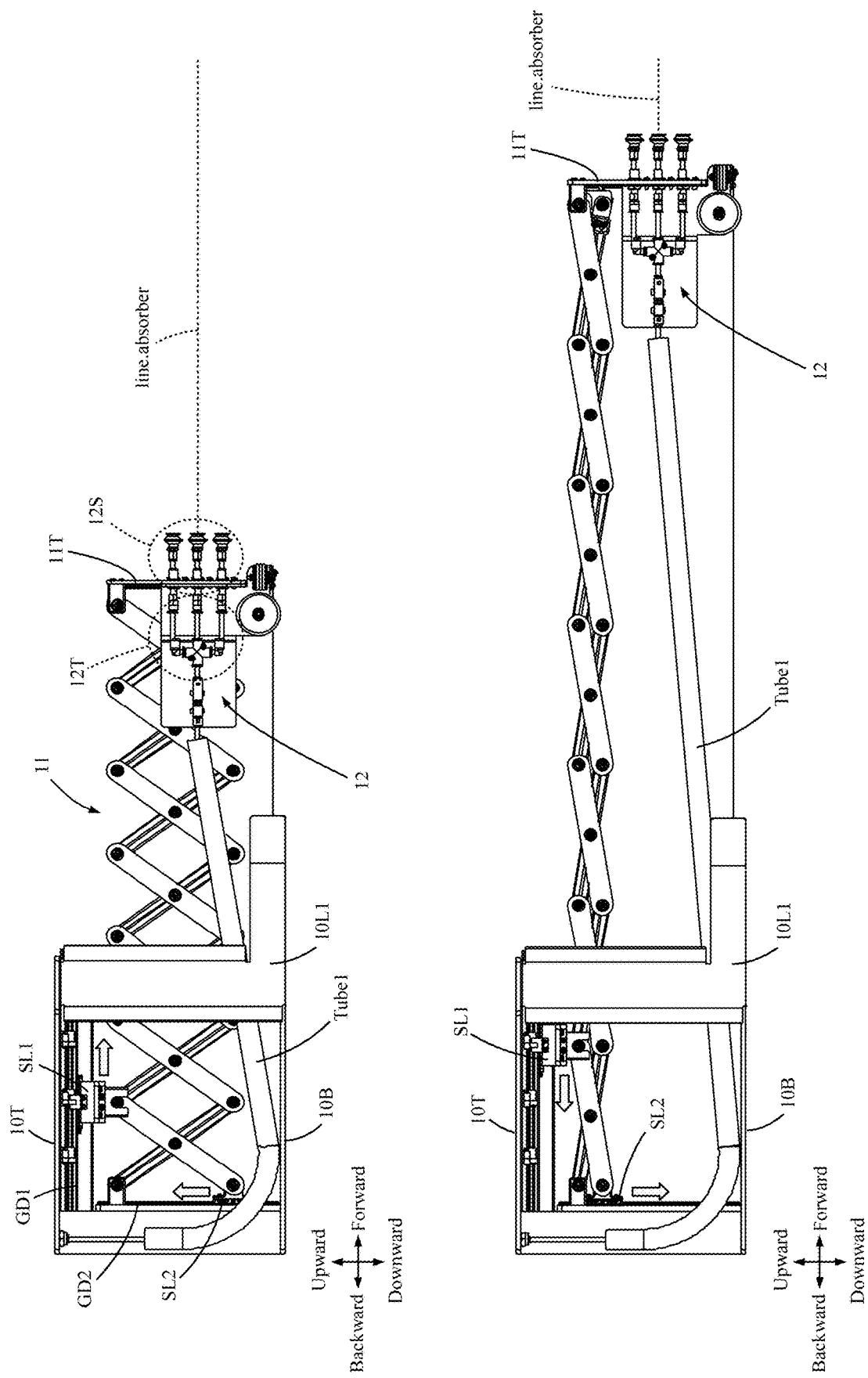
FIG. 6 is a diagram showing a schematic configuration of the robot hand 100 according to the first embodiment (a diagram extracting and showing a telescopic mechanism 11 and a suction mechanism 12).

FIG. 6 is a diagram showing a schematic configuration of the robot hand 100 according to the first embodiment (a diagram extracting and showing the telescopic mechanism 11 and the suction mechanism 12). Further, the forward, backward, upward, and downward directions shall be defined as shown in the upper portion and the lower portion of FIG. 6.

Figure 7:
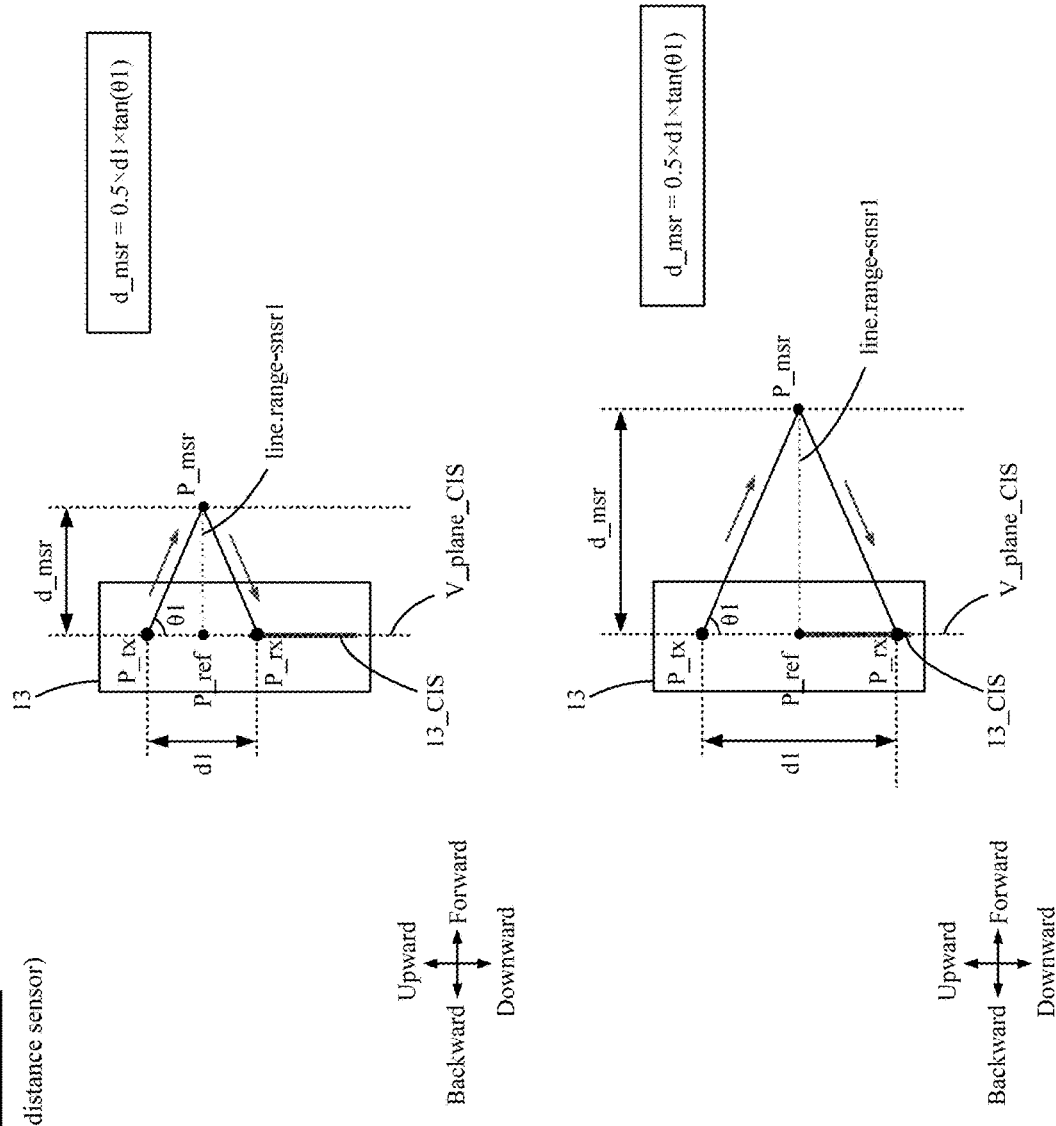
FIG. 7 is a diagram showing a schematic configuration of a first distance sensor 13 of the robot hand 100 according to the first embodiment.

FIG. 7 is a diagram showing a schematic configuration of a first distance sensor 13 of the robot hand 100 according to the first embodiment.

FIG. 8 is a diagram showing a schematic configuration of the robot hand 100 according to the first embodiment, and showing a line line.absorber indicating the expansion and contraction direction of the telescopic mechanism 11, a straight line line.range-snsr1 connecting a measurement reference point of the first distance sensor 13 and a measurement point, a straight line line.range-snsr2 connecting a measurement reference point of the second distance sensor 14 and a measurement point, a straight line line.camera indicating the optical axis of an imaging unit 15, and a virtual plane V_plane1 (a plane parallel to a $y_{rh}$-$z_{rh}$ plane) orthogonal thereto.

Figure 9:
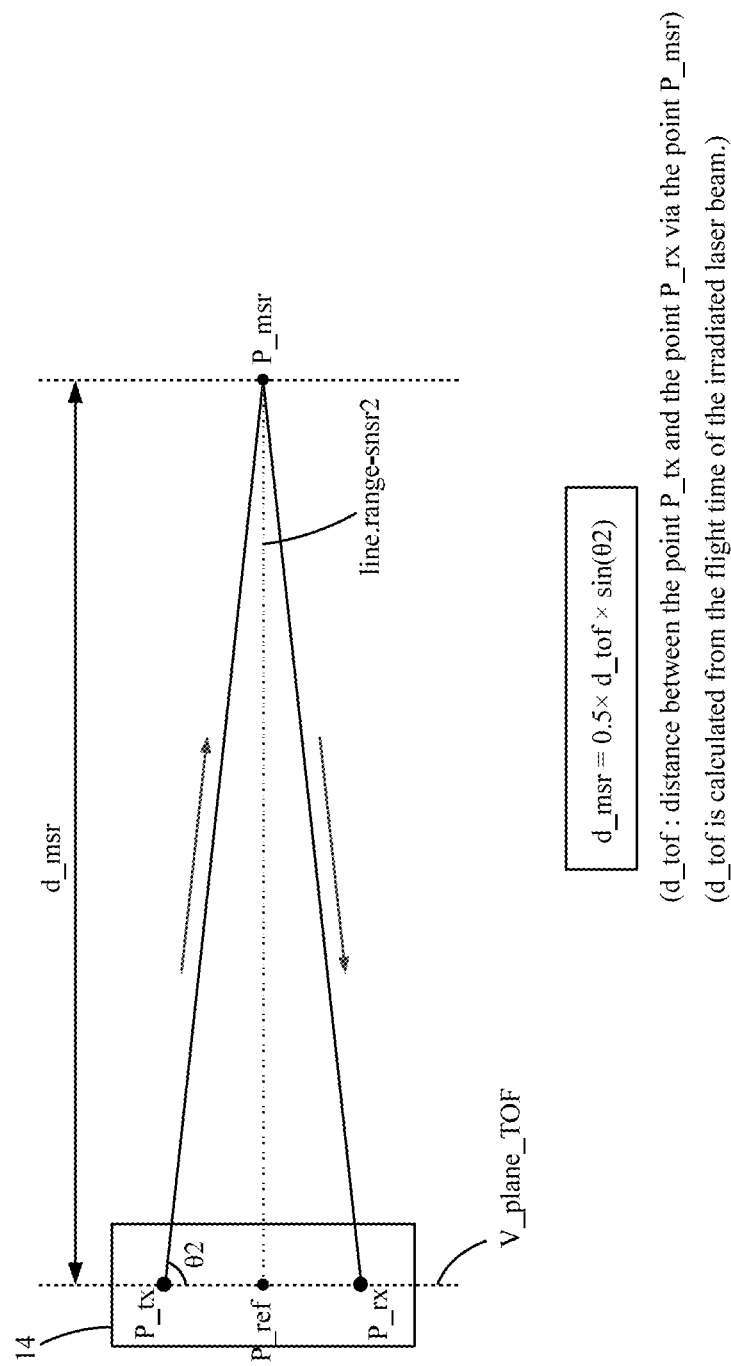
FIG. 9 is a diagram showing a schematic configuration of the second distance sensor 14 of the robot hand 100 according to the first embodiment.

FIG. 9 is a diagram showing a schematic configuration of the second distance sensor 14 of the robot hand 100 according to the first embodiment.

Figure 10:
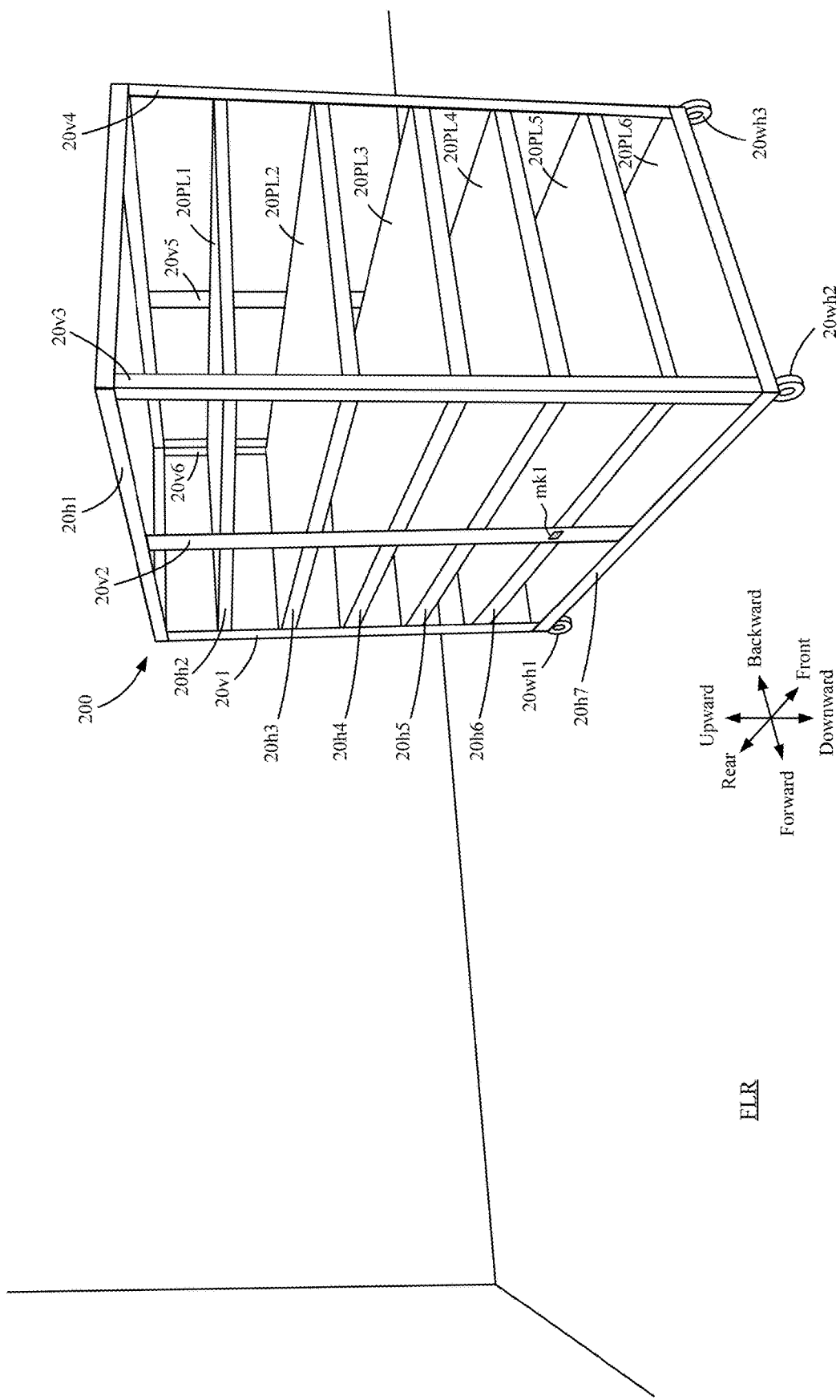
FIG. 10 is a diagram showing a schematic configuration of a mobile cart 200 according to the first embodiment.

FIG. 10 is a diagram showing a schematic configuration of a mobile cart 200 according to the first embodiment. Note that the direction of the mobile cart 200 shall be defined as the forward, backward, upward, downward, rear, and front directions as shown in FIG. 10.

Figure 11:
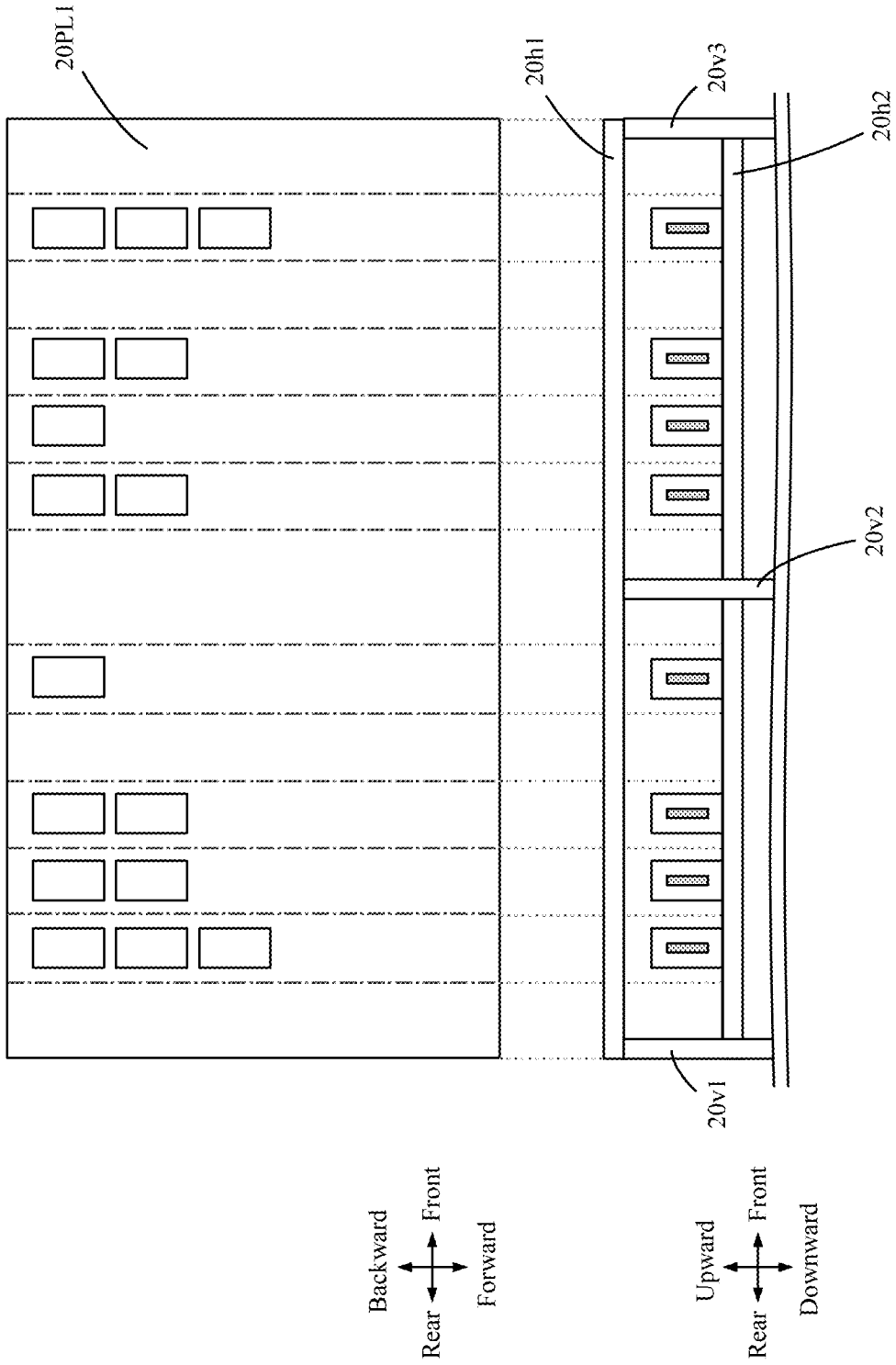
FIG. 11 is a diagram showing a schematic configuration of the mobile cart 200 according to the first embodiment.

FIG. 11 is a diagram showing a schematic configuration of the mobile cart 200 according to the first embodiment. Note that the direction of the mobile cart 200 shall be defined as the forward, backward, upward, downward, rear, and front directions as shown in FIG. 11.

The article conveyance processing system 1000 is, for example, a system capable of performing processing of taking out article(s) from a mobile shelf and/or placing article(s) on the mobile shelf (e.g., a mobile cart). As shown in FIGS. 1 and 2, the article conveyance processing system 1000 includes, for example, a moving mechanism Rbt_arm (for example, a robot arm or an articulated robot arm), a robot hand 100, and a control device Dev1 that controls the moving mechanism Rbt_arm and the robot hand 100. The article conveyance processing system 1000 can take out articles (e.g., cash boxes) placed on the shelf of the mobile cart 200 by the robot hand 100 and/or convey articles (e.g., cash boxes) by the robot hand 100 and place them on the shelf of the mobile cart 200.

The moving mechanism Rbt_arm is a moving mechanism for freely moving the robot hand 100 in a predetermined region in the three-dimensional space. The moving mechanism Rbt_arm is configured using, for example, a multi-articulated robot arm. As shown in FIG. 3, the moving mechanism Rbt_arm is configured using, for example, a multi-articulated robot arm having six degrees of freedom. The moving mechanism Rbt_arm is installed on a base B1 installed on the floor FLR. As shown in FIG. 3, the moving mechanism Rbt_arm includes a base Rbt_base, a first link Rbt_L1, a second link Rbt_L2, a third link Rbt_L3, a fourth link Rbt_L4, a fifth link Rbt_L5, and a sixth link Rbt_L6.

The first link Rbt_L1 is connected to the base Rbt_base so as to be rotatable around the axis $r\_ax_1$ with the axis $r\_ax_1$ as a rotation axis (rotation angle is $\theta_1$). The first link Rbt_L1 is connected to the second link Rbt_L2 such that the second link Rbt_L2 is rotatable around the axis $r\_ax_2$ with the axis $r\_ax_2$ as a rotation axis.

The second link Rbt_L2 is connected to the first link Rbt_L1 so as to be rotatable around the axis $r\_ax_2$ (rotation angle is $\theta_2$) with the axis $r\_ax_2$ as a rotation axis. The second link Rbt_L2 is also connected to the third link Rbt_L3.

The third link Rbt_L3 is connected to the second link Rbt_L2. The third link Rbt_L3 is also connected to the fourth link Rbt_L4 so that the fourth link Rbt_L4 is rotatable around the axis $r\_ax_3$ with the axis $r\_ax_3$ as a rotation axis.

The fourth link Rbt_L4 is connected to the third link Rbt_L3 so as to be rotatable around the axis $r\_ax_3$ (rotation angle is $\theta_3$) with the axis $r\_ax_3$ as a rotation axis. The fourth link Rbt_L4 is also connected to the fifth link Rbt_L5 such that the fifth link Rbt_L5 is rotatable around the axis $r\_ax_4$ with the axis $r\_ax_4$ as a rotation axis.

The fifth link Rbt_L5 is connected to the fourth link Rbt_L4 so as to be rotatable around the axis $r\_ax_4$ (rotation angle is $\theta_4$) with the axis $r\_ax_4$ as a rotation axis. The fifth link Rbt_L5 is also connected to the fifth link Rbt_L6 such that the sixth link Rbt_L6 is rotatable around the axis $r\_ax_5$ with the axis $r\_ax_5$ as a rotation axis.

The sixth link Rbt_L6 is connected to the fifth link Rbt_L5 so as to be rotatable around the axis $r\_ax_5$ with the axis $r\_ax_5$ as a rotation axis (rotation angle is $\theta_5$). Further, the sixth link Rbt_L6 has a mechanism (referred to as a "robot hand attachment mechanism") for attaching the robot hand 100 to the tip portion thereof.

The moving mechanism Rbt_arm drives each joint (each link) by an actuator (not shown) based on a command (a command (a torque command) for rotating each joint (each link) by a predetermined angle) from the control unit 1, and moves the robot hand 100 attached to the tip of the moving mechanism Rbt_arm to a predetermined position in the three-dimensional space.

The robot hand 100 is a mechanism that is attached to the tip portion of the moving mechanism Rbt_arm in a attitude controllable manner, for example, to take out an article (for example, a cash box) placed on a shelf of the mobile cart 200 from the mobile cart 200, convey the article to a predetermined place, and/or place the article in a predetermined position (for example, a predetermined position on a predetermined shelf) of the mobile cart 200.

As shown in FIG. 4A, the robot hand 100 includes a flat top plate 10T, a flat bottom plate 10B, and side plates 10S1 and 10S2 that are disposed between the top plate 10T and the bottom plate 10B and function as supports for supporting the top plate 10T and the bottom plate 10B. Further, as shown in FIGS. 4A and 4B, the robot hand 100 includes a placing portion 10Tr including a first side L-shaped plate 10L1, a second side L-shaped plate 10L2, and a placing flat plate 10LT installed between the first side surface L-shaped plate 10L1 and the second side surface L-shaped plate 10L2. As shown in FIGS. 2 and 4, the robot hand 100 includes a telescopic mechanism 11, an adsorption mechanism 12, a first distance sensor 13, a second distance sensor 14, and an imaging unit 15.

It is assumed that the frame 10Fr of the robot hand 100 mainly includes the top plate 10T, the bottom plate 10B, the side plates 10S1 and 10S2, the first side L-shaped plate 10L1, and the second side L-shaped plate 10L1.

The top plate 10T is a substantially rectangular flat plate, and has a robot hand connection mechanism JT10 on an upper surface thereof; the robot hand connection mechanism JT10 is rotatably (attitude-controllably) attached to the tip portion of the moving mechanism Rbt_arm. The side plates 10S1 and 10S2, the first side L-shaped plate 10L1, and the second side L-shaped plate 10L1 are attached to the lower surface of the top plate 10T.

The bottom plate 10B has the side plates 10S1 and 10S2 attached to the upper surface thereof. Further, the bottom plate 10B has the imaging unit 15 attached to the lower surface thereof. Further, the placing flat plate 10LT is attached to the lower surface of the front end portion of the bottom plate 10B.

As shown in FIG. 4A, one end of each of the side plate 10S1 and 10S2 is attached to the lower surface of the top plate 10T, and the other end is attached to the upper surface of the bottom plate 10B. The side plates 10S1 and 10S2 are arranged at positions facing each other so as to be substantially parallel to each other, and are arranged so as to sandwich the placing flat plate 10LT as shown in FIG. 4B.

As shown in FIG. 5B, for the frame 10Fr of the robot hand 100, the attitude of the robot hand 100 is determined by using the attitude determination coordinate system defined by three normal orthogonal vectors $\{x_{rh}, y_{rh}, z_{rh}\}$, which are orthogonal to each other with the intersection of the rotation axis r_ax$_4$, the rotation axis r_ax$_5$, and the rotation axis r_ax$_6$ of the moving mechanism Rbt_arm as the origin Org_rbh_ori. In the frame 10Fr of the robot hand 100, the top surface of the top plate 10T is substantially parallel to the $x_{rh}$-$y_{rh}$ plane and substantially perpendicular to $y_{rh}$-$z_{rh}$ plane as shown in FIG. 5B. It is assumed that the long side of the upper surface of the top plate 10T and the $x_{rh}$ axis are substantially parallel to each other.

Note that the attitude control of the robot hand 100 (the frame 10Fr of the robot hand) is performed as follows. In the moving mechanism Rbt_arm, the fifth link Rbt_L5 is rotated around the rotation axis r_ax$_4$ by an angle $\theta_4$, the sixth link Rbt_L6 is rotated around the rotation axis r_ax$_5$ by an angle $\theta_5$, and the robot hand 100 is rotated around the rotation axis r_ax$_6$ by an angle $\theta_6$, thereby causing the robot hand 100 (the frame 10Fr of the robot hand) to be placed in any desired attitude. In other words, the robot hand 100 is controlled so as to have a predetermined attitude (predetermined orientation) by rotating the frame 10Fr as one unit around the three rotational axes r_ax$_4$, r_ax$_5$, and r_ax$_6$ by predetermined angles (see FIG. 5B).

The telescopic mechanism 11 is installed inside the frame 10Fr of the robot hand 100 and can move its tip portion in a predetermined direction. The telescopic mechanism 11 is provided by using, for example, a telescopic tong-type mechanism used for a magic hand or the like. The telescopic mechanism 11 has a rear end portion fixed to a rear end portion of the frame 10Fr (for example, a rear end portion of the lower surface of the top plate 10T), and the body of the telescopic mechanism 11 extends in a predetermined direction, thereby moving the tip portion of the telescopic mechanism 11 in a predetermined direction. The telescopic mechanism may be provided by using, for example, a technique and a configuration disclosed in Japanese Patent Application No. 2021-039180.

As shown in FIG. 6, a fixing flat plate 11T provided with a hole for fixing the suction mechanism 12 is attached to the tip portion of the telescopic mechanism 11, and the suction mechanism 12 is attached to the hole of the fixing flat plate 11T so as to penetrate therethrough. The main body of the telescopic mechanism 11 expands in a predetermined direction, so that the suction portion 12S of the suction mechanism 12 attached to the tip portion of the telescopic mechanism 11 moves in a predetermined direction (a direction indicated by a line line.absorber in FIG. 6). The telescopic mechanism 11 is configured such that the moving direction of the tip portion when the telescopic mechanism 11 expands and contracts (the direction indicated by the line line.absorber in FIG. 6) is in substantially the same direction as the normal line of the $y_{rh}$-$z_{rh}$ plane in the attitude determination coordinate system (the normal orthonormal vectors of the coordinate system are $\{x_{rh}, y_{rh}, z_{rh}\}$ (see FIG. 5)) for specifying the attitude of the robot hand 100 (the direction of the frame 10Fr of the robot hand 100).

For example, as shown in FIG. 6, when the telescopic mechanism 11 is a telescopic tong-type mechanism including a plurality of links, moving a slider SH1 movably mounted along the guide GD1 at one end of the link on the rear-most side and a slider SH2 movably mounted along the guide GD2 at the other end of the link in a predetermined direction allows the telescopic mechanism 11 to be expanded or contracted. In a case of FIG. 6, moving the slider SH1 and the slider SH2 along the guide GD1 and GD2 in the direction of the arrow shown in the upper drawing of FIG. 6 allows the telescopic mechanism 11 to be expanded, whereas moving the slider SH1 and the slider SH2 along the guide GD1 and GD2 in the direction of the arrow shown in the lower drawing of FIG. 6 allows the telescopic mechanism 11 to be contracted.

Then, as shown in FIG. 6, the moving direction of the tip portion when the telescopic mechanism 11 expands and contracts (the direction indicated by the line line.absorber in FIG. 6) becomes substantially the same direction as the normal line of the $y_{rh}$-$z_{rh}$ plane in the attitude determination coordinate system (the normal orthonormal vectors of the coordinate system are {$x_{rh}$, $y_{rh}$, $z_{rh}$} (see FIG. 5)) for specifying the attitude of the robot hand 100 (the direction of the frame 10Fr of the robot hand 100) (substantially the same direction as the forward-backward direction in FIG. 6).

The suction mechanism 12 includes a suction pipe 12T and a suction portion 12S, and is a mechanism for sucking an article or the like placed on a shelf or the like by the suction portion 12S. As shown in FIGS. 4 to 6, the suction mechanism 12 is attached to the fixing flat plate 11T, and the position thereof is moved by the expansion and contraction of the telescopic mechanism 11. Further, the suction mechanism 12 has the suction pipe 12T connected to the flexible tube Tube1, and makes it possible to control the flow of the air for suction via the suction portion 12S, the suction pipe 12T, and the flexible tube Tube1 even when the telescopic mechanism 11 expands and contracts and then the position of the suction portion 12S is moved. The suction mechanism 12 is controlled by the control unit 1 of the control device Dev1.

Note that the suction mechanism 12 is configured such that the suction portion 12S moves in substantially the same direction (substantially the same direction as the forward-backward direction in FIG. 6) as the normal line of the $y_{rh}$-$z_{rh}$ plane in the attitude determination coordinate system (the normal orthonormal vectors of the coordinate system are {$x_{rh}$, $y_{rh}$, $z_{rh}$} (see FIG. 5)) that specifies the attitude of the robot hand 100 (the direction of the frame 10Fr of the robot hand 100) when the telescopic mechanism 11 expands and contracts.

The first distance sensor 13 is a sensor that measures a distance between the robot hand 100 and a predetermined point (for example, a point on a substantially flat surface (e.g., a point on the frame of the mobile cart 200)), and is installed on the lower side of the side of the second side L-shaped plate 10L1 as shown in FIG. 4, for example. The first distance sensor 13 is, for example, a distance sensor for a short distance, and is provided by using a CIS type distance sensor (CIS: Contact Image Sensor) as shown in FIG. 7. As shown in FIG. 7, the first distance sensor 13 is set such that the irradiation point P_tx of the laser light and the light-receiving sensor 13_CIS are on the same plane (on the virtual plane V_plane_CIS in FIG. 7); the first distance sensor 13 measures a distance based on a position on the light-receiving sensor 13_CIS where the laser light irradiated from the irradiation point P_tx toward the measurement point P_msr is reflected at the measurement point P_msr and then the reflected light reaches. Specifically, as shown in FIG. 7, assuming that θ1 is an irradiation angle of the laser beam of the first distance sensor 13 (an angle formed by the virtual plane V_plane_CIS of FIG. 7 and the laser beam irradiated) and a distance between the irradiation point P_tx and the light receiving point P_rx is d1, a distance d_msr between the measurement reference point P_ref (point P_ref on the virtual plane V_plane_CIS of FIG. 7) and the measurement point P_msr is calculated as follows:

$$d\_msr = 05 \times d1 \times \tan(\theta 1).$$

The first distance sensor 13 is controlled by the control unit 1 of the control device Dev1.

Figure 8B:
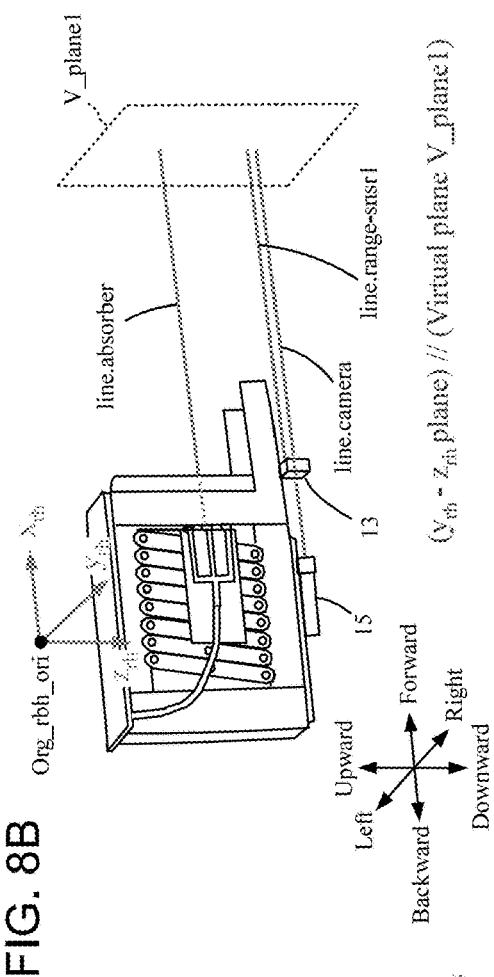
FIG. 8 is a diagram showing a schematic configuration of the robot hand 100 according to the first embodiment, and showing a line line.absorber indicating the expansion and contraction direction of the telescopic mechanism 11, a straight line line.range-snsr1 connecting a measurement reference point of the first distance sensor 13 and a measurement point, a straight line line.range-snsr2 connecting a measurement reference point of the second distance sensor 14 and a measurement point, a straight line line.camera indicating the optical axis of an imaging unit 15, and a virtual plane V_plane1 (a plane parallel to a $y_{rh}$-$z_{rh}$ plane) orthogonal thereto.
Figure 8C:
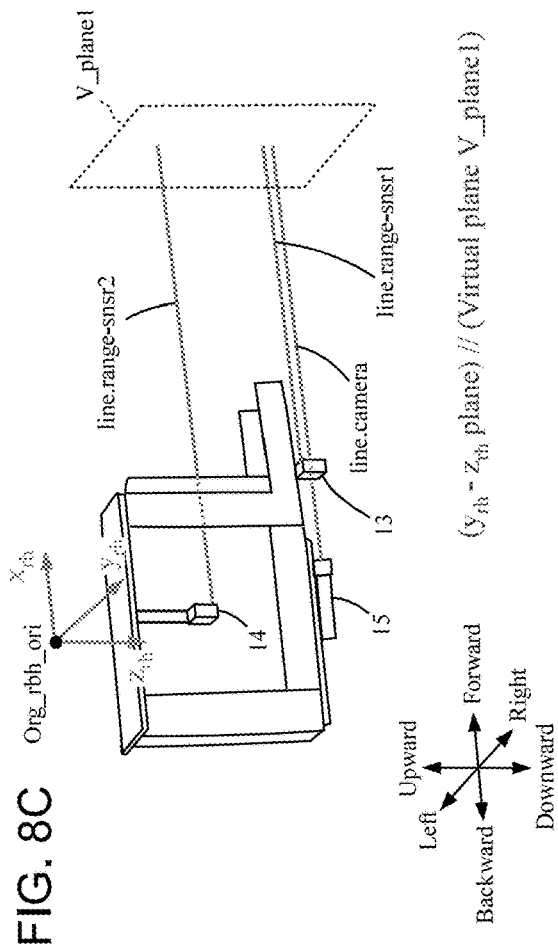
Figure 8A:
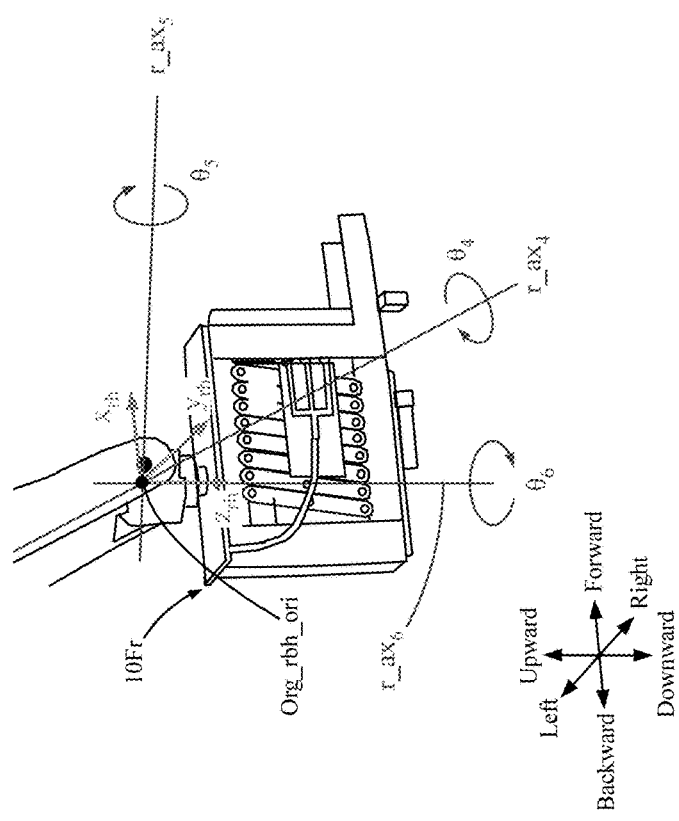

Assuming that the straight line connecting the measurement reference point P_ref and the measurement point P_msr is a straight line line.range-snsr1, as shown in FIG. 8, the first distance sensor 13 is configured such that the straight line line.range-snsr1 has substantially the same direction as the normal line of the $y_{rh}$-$z_{rh}$ plane in the attitude determination coordinate system (the normal orthonormal vectors of the coordinate system are {$x_{rh}$, $y_{rh}$, $z_{rh}$} (see FIG. 5)) that specifies the attitude of the robot hand 100 (the direction of the frame 10Fr of the robot hand 100); and the first distance sensor 13 is arranged at a predetermined position on the frame 10Fr. The virtual plane V_plane1 shown in FIGS. 8B and 8C is a plane parallel to the $y_{rh}$-$z_{rh}$ plane in the attitude determination coordinate system (the normal orthonormal vectors of the coordinate system are {$x_{rh}$, $y_{rh}$, $z_{rh}$} (see FIG. 5)), and the straight line line.range-snsr1 substantially coincides with the normal line of the virtual plane V_plane1.

The second distance sensor 14 is a sensor that measures a distance between the robot hand 100 and a predetermined point (e.g., a point on a substantially flat surface (e.g., a point on a surface of an article placed on a shelf of the mobile cart 200)); and the second distance sensor 14 is installed at a predetermined position in the frame 10Fr (e.g., a position on the side of the telescopic mechanism 11, the position being a position at about the middle of the height of the frame 10Fr), as shown in FIG. 4C, for example. The second distance sensor 14 is, for example, a long distance sensor, and is provided by using a TOF type distance sensor (TOF: Time Of Flight) as shown in FIG. 9. As shown in FIG. 9, the second distance sensor 14 is set such that the irradiation point P_tx of the laser light and the light receiving point P_rx are on the same plane (on the virtual plane V_plane_TOF in FIG. 9), and measures a distance by the time taken for the laser light emitted from the irradiation point P_tx toward the measurement point P_msr to reflect at the measurement point P_msr and for the reflected light to reach the light receiving point P_rx. Specifically, as shown in FIG. 9, assuming that θ2 is an irradiation angle of the laser beam of the second distance sensor 14 (an angle formed by the virtual plane V_plane_TOF of FIG. 9 and the laser beam irradiated), and d_tof is a flight distance (a distance between point P_tx, point P_msr and point P_rx) of the laser beam, a distance d_msr between the measurement reference point P_ref (point P_ref on the virtual plane V_plane_TOF in FIG. 9) and the measurement point P_msr is calculated as follows:

$$d\_msr = 0.5 \times d\_tof \times \sin(\theta 2)$$

The second distance sensor 14 is controlled by the control unit 1 of the control device Dev1.

As shown in FIG. 8, assuming that a straight line connecting the measurement reference point P_ref and the measurement point P_msr is a straight line line.range-snsr2, the second distance sensor 14 is configured such that the straight line line.range-snsr1 is in substantially the same direction as the normal line of the $y_{rh}$-$z_{rh}$ plane in the attitude determination coordinate system (the normal orthogonal vectors of the coordinate system are {$x_{rh}$, $y_{rh}$, $z_{rh}$} (see FIG. 5)) for specifying the attitude of the robot hand 100 (the orientation of the frame 10Fr of the robot hand 100), and is arranged at a predetermined position on the frame 10Fr. The virtual plane V_plane1 shown in FIGS. 8B and 8C is a plane parallel to the $y_{rh}$-$z_{rh}$ plane in the attitude determination coordinate system (the normal orthonormal vectors of the coordinate system are {$x_{rh}$, $y_{rh}$, $z_{rh}$} (see FIG. 5)), and the straight line line.range-snsr2 substantially coincides with the normal line of the virtual plane V_plane1.

The imaging unit 15 is, for example, a small camera equipped with an optical system including one or more lenses, a CMOS image sensor, a CCD image sensor, or the like, is attached to a lower surface of the bottom plate 10B of the robot hand 100 (for example, a substantially center position in the widthwise direction of the lower surface of the bottom plate 10B), and captures an image of the foreground of the robot hand 100. The imaging unit 15 is controlled by the control unit 1 of the control device Dev1.

As shown in FIG. 8, assuming the straight line representing the optical axis of the optical system is a straight line line.camera, the imaging unit 15 is configured such that the straight line line.camera has substantially the same direction as the normal line of the $y_{rh}$-$z_{rh}$ plane in the attitude determination coordinate system (the normal orthonormal vectors of the coordinate system are $\{x_{rh}, y_{rh}, z_{rh}\}$ (see FIG. 5)) that specifies the attitude of the robot hand 100 (the orientation of the frame 10Fr of the robot hand 100); and the imaging unit 15 is arranged at a predetermined position on the frame 10Fr. The virtual plane V_plane1 shown in FIGS. 8B and 8C is a plane parallel to the $y_{rh}$-$z_{rh}$ plane in the attitude determination coordinate system (the normal orthonormal vectors of the coordinate system are $\{x_{rh}, y_{rh}, z_{rh}\}$ (see FIG. 5)); and the straight line camera substantially coincides with the normal line of the virtual plane V_plane1.

As shown in FIG. 8, the telescopic mechanism 11, the first distance sensor 13, the second distance sensor 14 and the imaging unit 15 is configured and arranged such that the straight line line.absorber, the straight line line.range-snsr1, the straight line line.range-snsr2, and the straight line line.camera are always maintained so as for them to substantially coincide with the normal of the $y_{rh}$-$z_{rh}$ plane (and the virtual plane V_plane1) in the attitude determination coordinate system (the normal orthonormal vectors of the coordinate system are $\{x_{rh}, y_{rh}, z_{rh}\}$ (see FIG. 5)) no matter what attitude the robot hand 100 is in (no matter how it is attitude-controlled).

As shown in FIG. 2, the control device Dev1 includes a control unit 1, a communication interface IF1, and a storage unit Mem1.

The control unit 1 is connected to the moving mechanism Rbt_arm, the telescopic mechanism 11, the suction mechanism 12, the first distance sensor 13, the second distance sensor 14, and the imaging unit 15, and controls the moving mechanism Rbt_arm, the telescopic mechanism 11, the suction mechanism 12, the first distance sensor 13, the second distance sensor 14, and the imaging unit 15. Further, the control unit 1 performs conversion processing between the robot coordinate system and the cart coordinate system (details will be described later).

The communication interface IF1 is a communication interface for performing wired or wireless communication with an external device (not shown).

The storage unit Mem1 is a memory for storing data; data stored in the storage unit Mem1 can be read out by the control unit 1, and predetermined data can be written into the storage unit Mem1 by the control unit 1.

As shown in FIGS. 1 and 10, the mobile cart 200 has a plurality of shelves on which articles (for example, cash boxes) can be placed, and each shelf is supported by a plurality of frames. As shown in FIG. 10, the mobile cart 200 includes, for example, frames 20v1, 20v2, 20v3, 20v4, 20v5 and 20v6 installed in a vertical direction and frames 20h1, 20h2, 20h3, 20h4, 20h5, 20h6 and 20h7 installed in a horizontal direction (lateral direction); and the mobile cart 200 is arranged such that placing flat plates (shelves) 20PL1, 20PL2, 20PL3, 20PL4, 20PL5 and a 20PL6 are supported by the above-described frames. The placing flat plates (shelves) 20PL1 to 20PL6 are arranged so as to be parallel to each other and to be equally spaced.

Further, as shown in FIGS. 1 and 10, the mobile cart 200 has four wheels 20wh1, 20wh2, 20wh3 and 20wh4 (the wheel 20wh4 is installed below the frame 20v6, but is located at a blind spot in FIGS. 1 and 10 and is not shown), and can be moved manually, for example.

As shown in FIGS. 1 and 10, for example, the mobile cart 200 has an identification information mark mk1 that includes identification information of the mobile cart and that is attached to the vicinity of a position where the vertical frame 20v2 and the horizontal frame 20h6 intersect. Note that the identification information mark may be attached to the opposite side of the mobile cart 200 (for example, in the vicinity of a position where the vertical frame 20v5 and the horizontal frame 20h6 intersect).

In addition, articles (for example, cash boxes) are placed on each shelf (on each placing flat plate) of the mobile cart 200 with the articles arranged. FIG. 11 shows a state in which the cash boxes are arranged and placed on the placing flat plate 20PL1 which is the uppermost shelf of the mobile cart 200. The upper portion of FIG. 11 is a top view of the placing flat 20PL1, which is the uppermost shelf of the mobile cart 200, showing the cash box being placed on the placing flat 20PL1 as a rectangle. The lower portion of FIG. 11 is a front view of the placing flat plate 20PL1, which is the uppermost shelf of the mobile cart 200.

Guides (e.g., guides (guide plates) provided on a moving rack disclosed in JP-A-2021-039181 may be employed as these guides) may be provided in part or all of the positions indicated by the one-dot chain line in FIG. 11, thereby restricting the arrangement of the cash boxes (or substantially rectangular articles) so that the cash boxes are aligned in a row and placed on the placing flat plate 20PL1.

In the above description, the placing flat plate 20PL1 that is the uppermost shelf of the mobile cart 200 has been described, but the same applies to other placing flat plates 20PL2 to 20PL6.

1.2: Operation of Article Conveyance Processing System

The operation of the article conveyance processing system 1000 configured as described above will be described with reference to the drawings.

Figure 12:
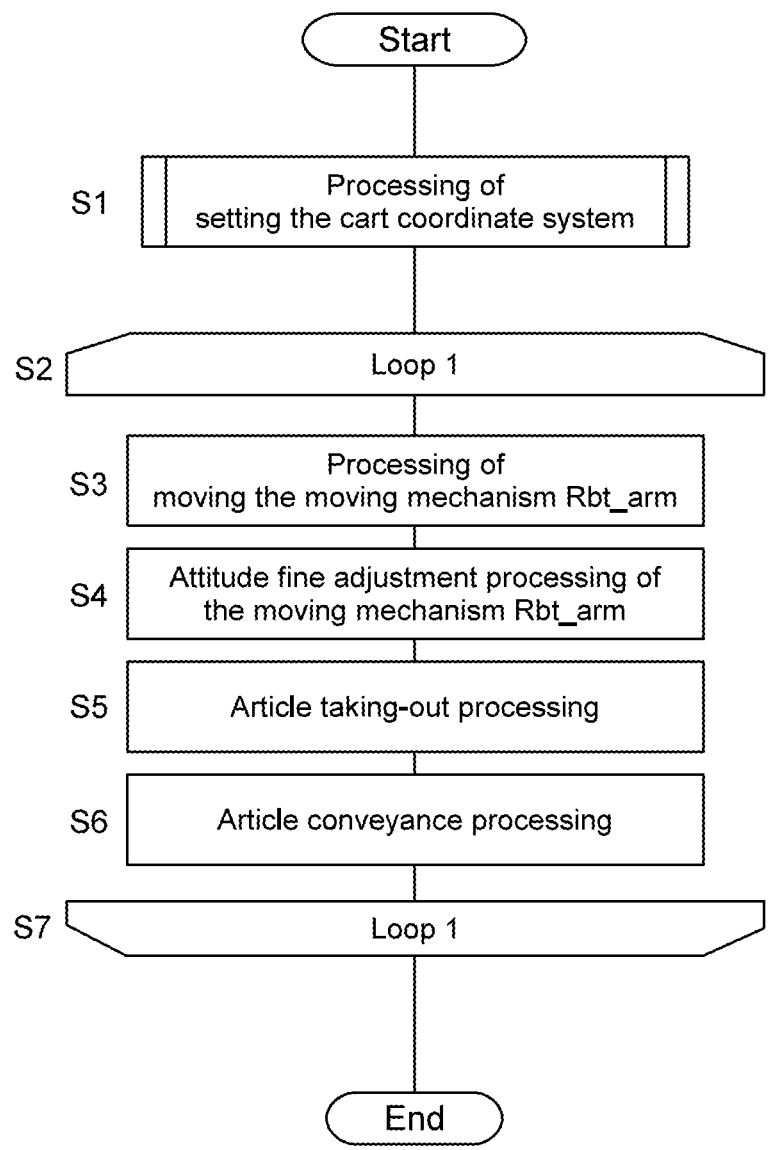
FIG. 12 is a flowchart of processing performed by the article conveyance processing system 1000.
Figure 13:
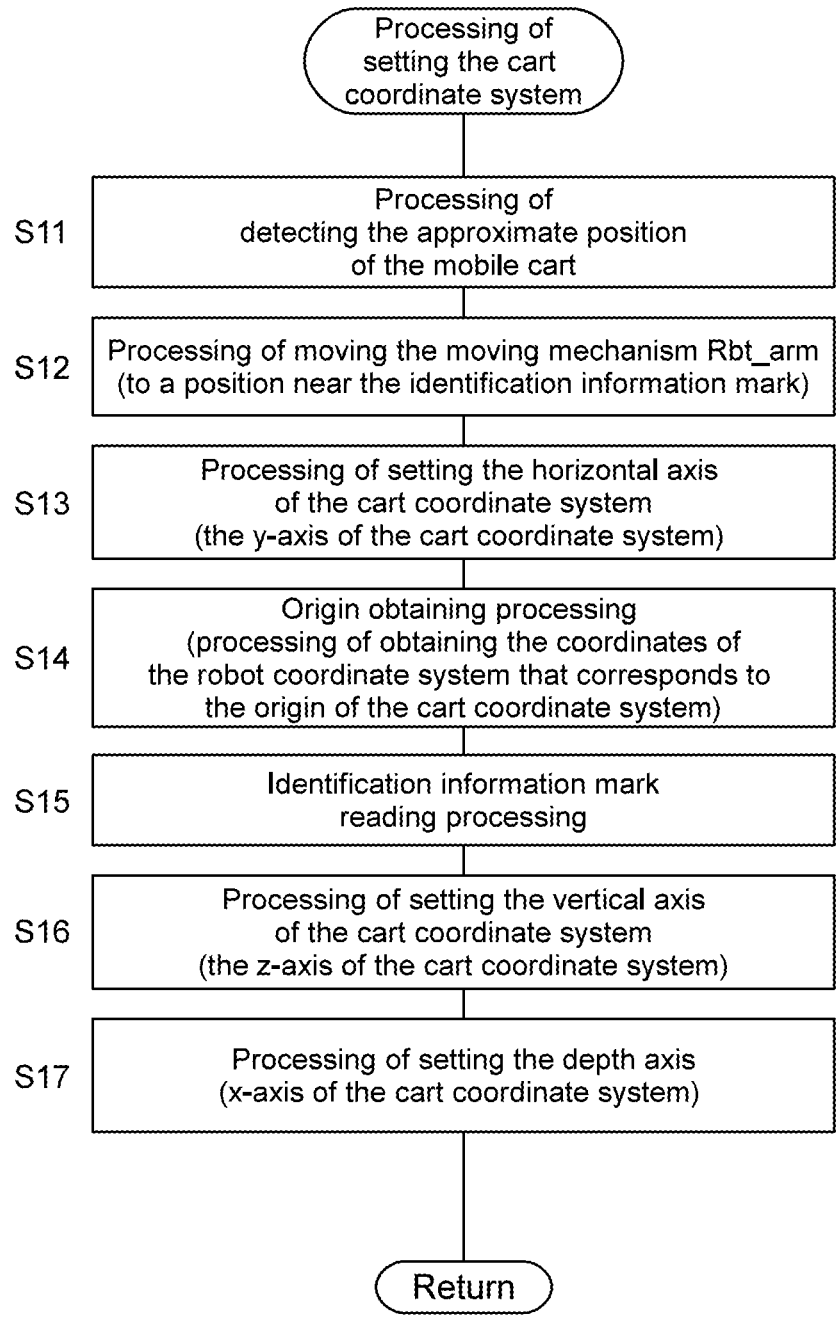
FIG. 13 is a flowchart of processing performed by the article conveyance processing system 1000.
Figure 14:
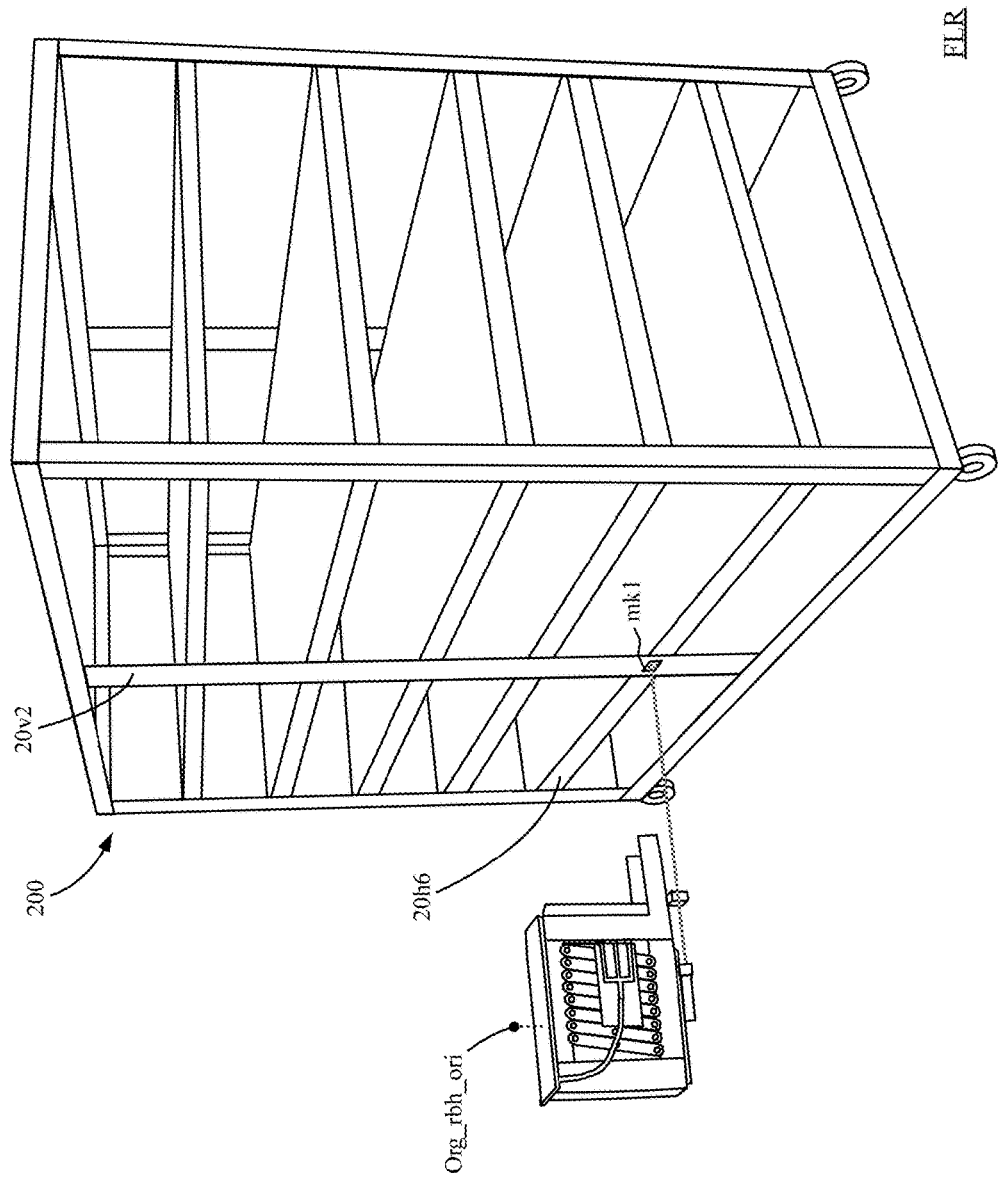
FIG. 14 is a diagram for explaining processing performed by the article conveyance processing system 1000.

FIG. 12 and FIG. 13 are flowcharts of processing performed by the article conveyance processing system 1000.

FIGS. 14 to 24 are diagrams for describing processing performed by the article conveyance processing system 1000. In FIGS. 14 to 16, FIG. 18, FIG. 20, and FIG. 21, the moving mechanism Rbt_arm (the robot arm Rbt_arm) is omitted.

Hereinafter, the operation of the article conveyance processing system 1000 will be described with reference to the flowcharts of FIGS. 12 and 13.

Step S1:

In step S1, the cart coordinate system setting processing is performed.

Step S11:

In step S11, processing of detecting the approximate position of the mobile cart 200 is performed. For example, a case where the mobile cart 200 is transported manually and placed in the state (orientation) shown in FIG. 14 will be described. The control unit 1 of the control device Dev1 performs processing of obtaining the approximate position of the mobile cart 200 by the imaging unit 15 and various sensors of the robot hand 100 that are connected to the tip of the mobile unit Rbt_arm.

Step S12:

In step S12, the control unit 1 drives the moving mechanism Rbt_arm to move the robot hand 100 to a position (an area near the identification information mark mk1) where the details of the identification information mark mk1 of the mobile cart 200 can be imaged by the imaging unit 15. At this time, the control unit 1 performs attitude control of the robot hand 100 such that the optical axis (linear line camera) of the optical system of the imaging unit 15 is substantially perpendicular to the front surface of the frame to which the identification information mark mk1 of the mobile cart 200 is attached (for example, performs attitude control in consideration of the degree of distortion of the captured images of the identification information mark mk1).

Step S13:

In step S13, processing of setting the horizontal axis of the cart coordinate system (the y-axis of the cart coordinate system) is performed. Note that the "cart coordinate system" is a coordinate system that is set in accordance with the state (direction) of the mobile cart 200.

The control unit 1 drives the moving mechanism Rbt_arm to move the robot hand 100 to a position where the distance measurement can be performed by the first distance sensor 13 of the robot hand 100 by using two different points (for example, a point on the rear side and a point on the front side) on the horizontal frame 20$h$6 of the mobile cart 200 as distance measurement points with the identification information mark mk1 as a substantially center. The specific processing will be described below.

Figure 15:
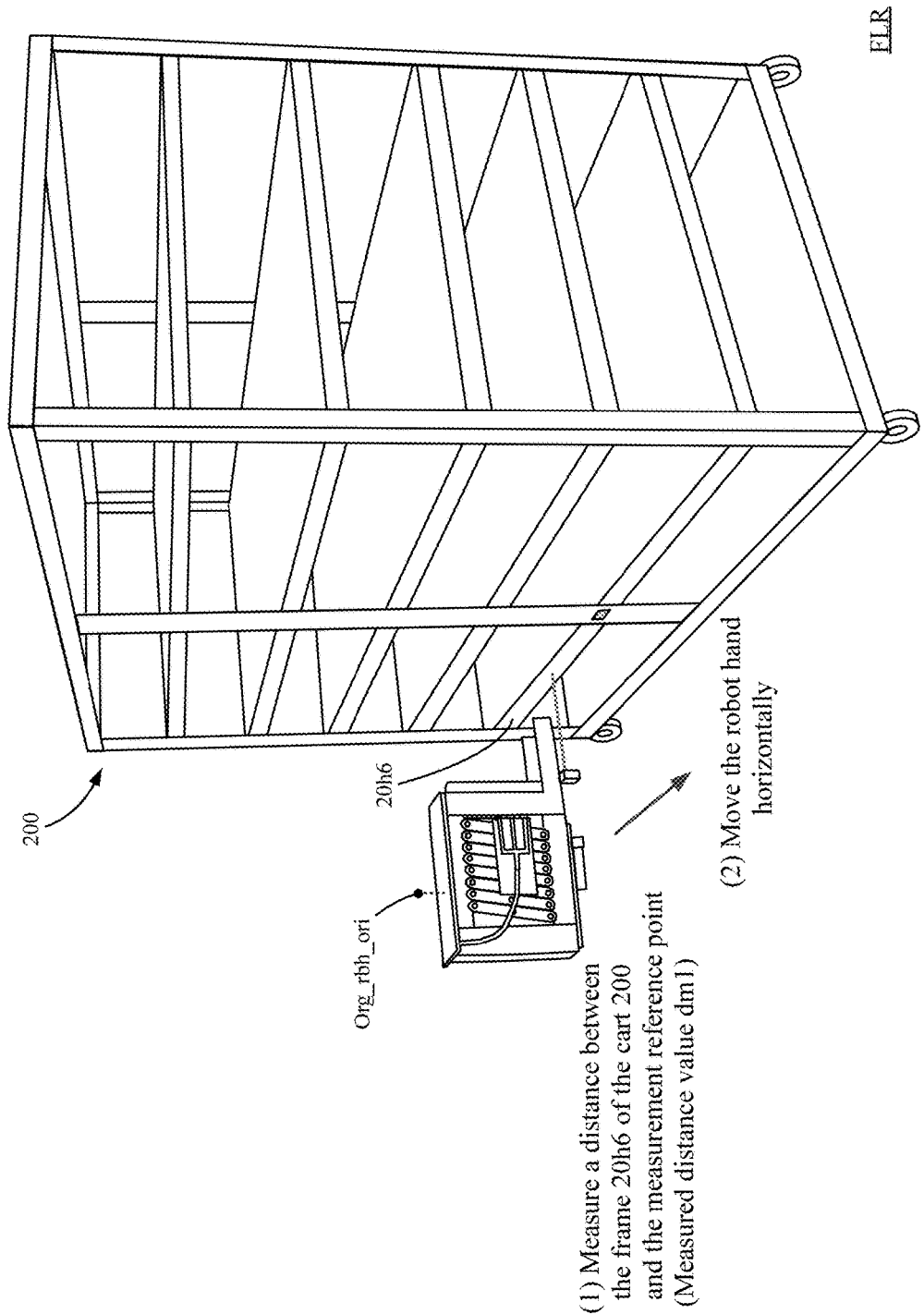
FIG. 15 is a diagram for explaining processing performed by the article conveyance processing system 1000.

First, as shown in FIG. 15, the control unit 1 drives the moving mechanism Rbt_arm, sets a point on the rear side of the identification information mark on the horizontal frame 20$h$6 as a distance measurement point, and moves the robot hand 100 to a position where the distance measurement can be performed by the first distance sensor 13 of the robot hand 100 while performing attitude control of the robot hand 100. In other words, as shown in FIG. 15, while performing attitude control of the robot hand 100, the control unit 1 moves the robot hand 100 to a position where the laser beam emitted from the first distance sensor 13 of the robot hand 100 can be reflected by the distance measurement point on the horizontal frame 20$h$6, and the reflected light can be received by the first distance sensor 13, thereby allowing for measuring the distance between the measurement reference point of the first distance sensor 13 and the distance measurement point. The control unit 1 then measures the distance between the measurement reference point and the distance measurement point (the horizontal frame 20$h$6 of the mobile cart 200) by the first distance sensor 13. In a case where the distance between the measurement reference point and the distance measurement point cannot be measured by the first distance sensor 13 of the robot hand 100, the control unit 1 may perform control (attitude control) to change the attitude of the robot hand 100 to a attitude in which the distance between the measurement reference point and the distance measurement point can be measured by the first distance sensor 13.

The measured value of the distance between the measurement reference point and the distance measurement point measured by the first distance sensor 13 is defined as a distance dm1, and the attitude (direction) of the robot hand 100 when the measured value is obtained is expressed as Ori(vec_$x_{rh}$, vec_$z_{rh}$) using the vector vec_$x_{rh}$ (the vector vec_$x_{rh}$ is a vector in the same direction as the $x_{rh}$ axis of the attitude determination coordinate system of the robot hand 100) and the vec_$z_{rh}$ (the vector vec_$z_{rh}$ is a vector in the same direction as the $z_{rh}$ axis of the attitude determination coordinate system of the robot hand 100) (the same applies hereinafter). Note that the attitude Ori(vec_$x_{rh}$, Vec_$z_{rh}$) indicates an attitude (orientation) in which the $x_{rh}$ axis (positive direction of the $x_{rh}$ axis) of the robot hand 100 coincides with the vector vec_$x_{rh}$ and the $z_{rh}$ axis (positive direction of the $z_{rh}$ axis) of the robot hand 100 coincides with the vector vec_$z_{rh}$.

Next, the control unit 1 drives the moving mechanism Rbt_arm, sets a point on the front side of the identification information mark on the horizontal frame 20$h$6 as a distance measurement point, and moves the robot hand 100 to a position where the distance measurement can be performed by the first distance sensor 13 of the robot hand 100 while performing attitude control of the robot hand 100 (while maintaining the attitude Ori(vec_$x_{rh}$, vec_$z_{rh}$)).

Figure 16:
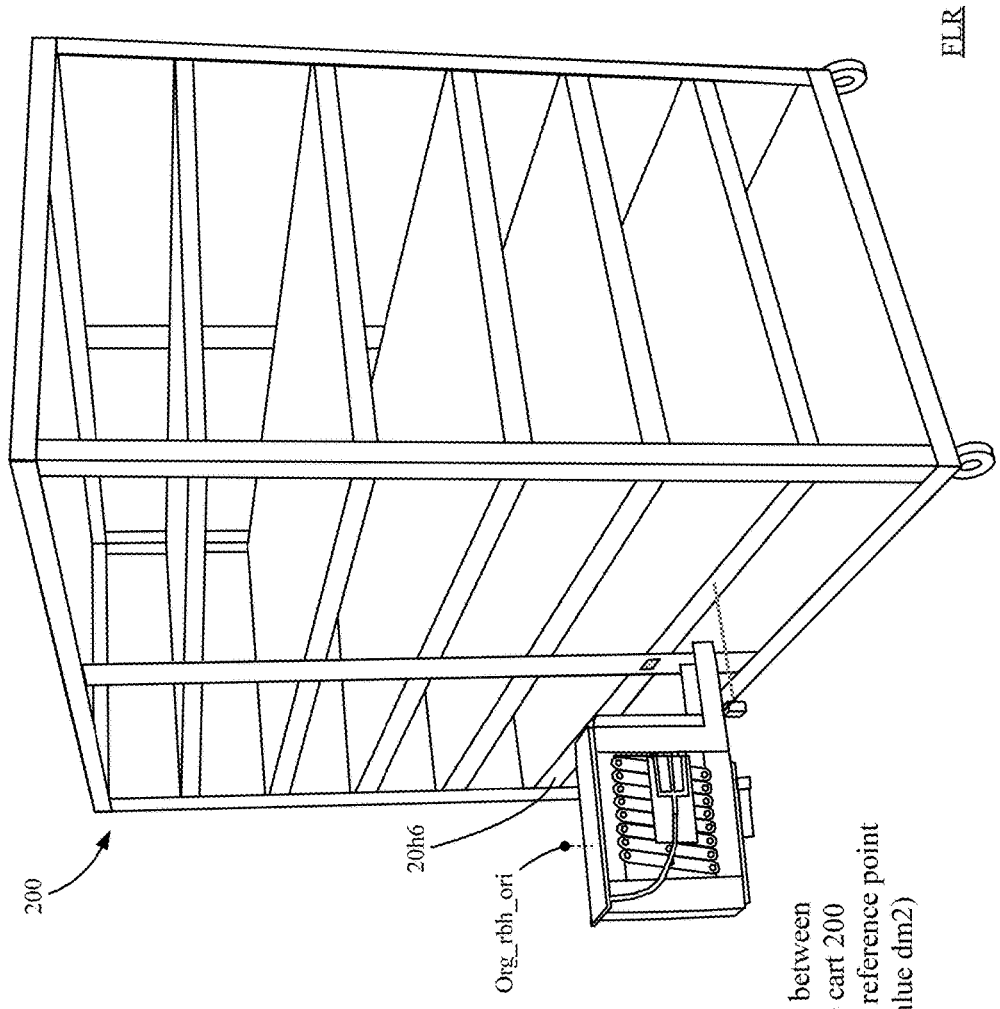
FIG. 16 is a diagram for explaining processing performed by the article conveyance processing system 1000.
Figure 17:
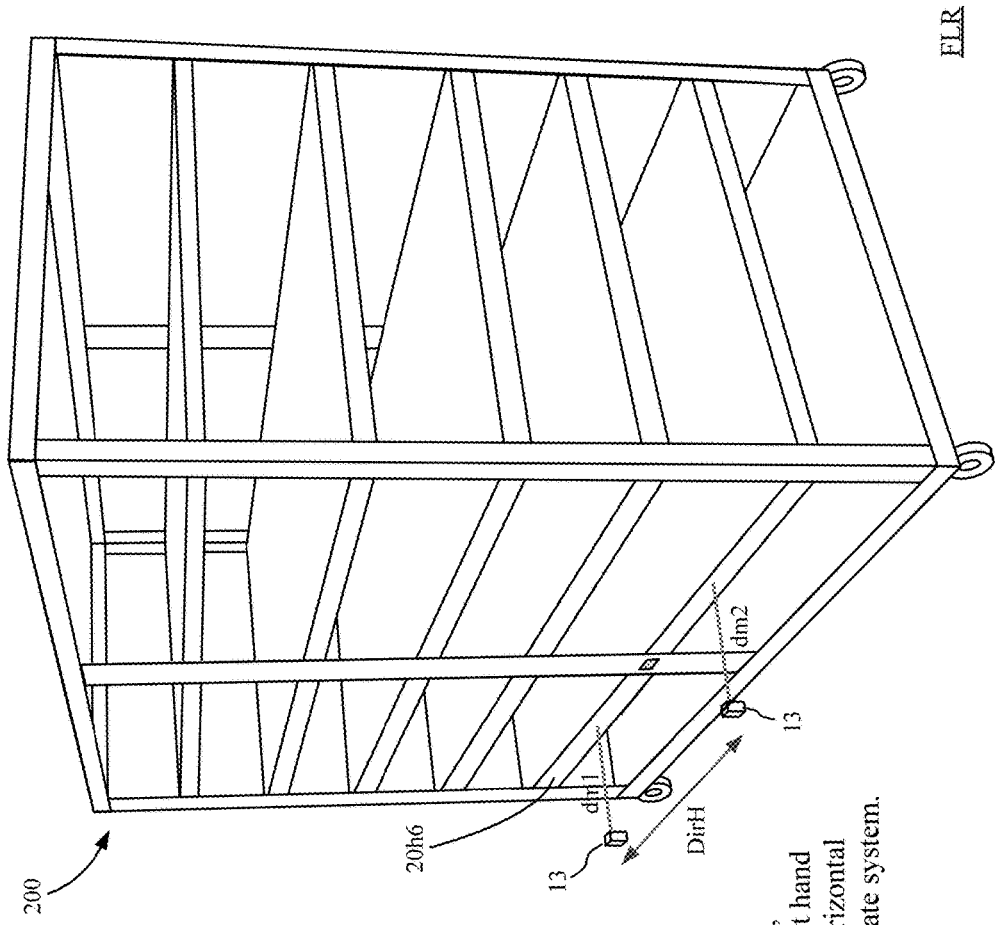
FIG. 17 is a diagram for explaining processing performed by the article conveyance processing system 1000.
Figure 18:
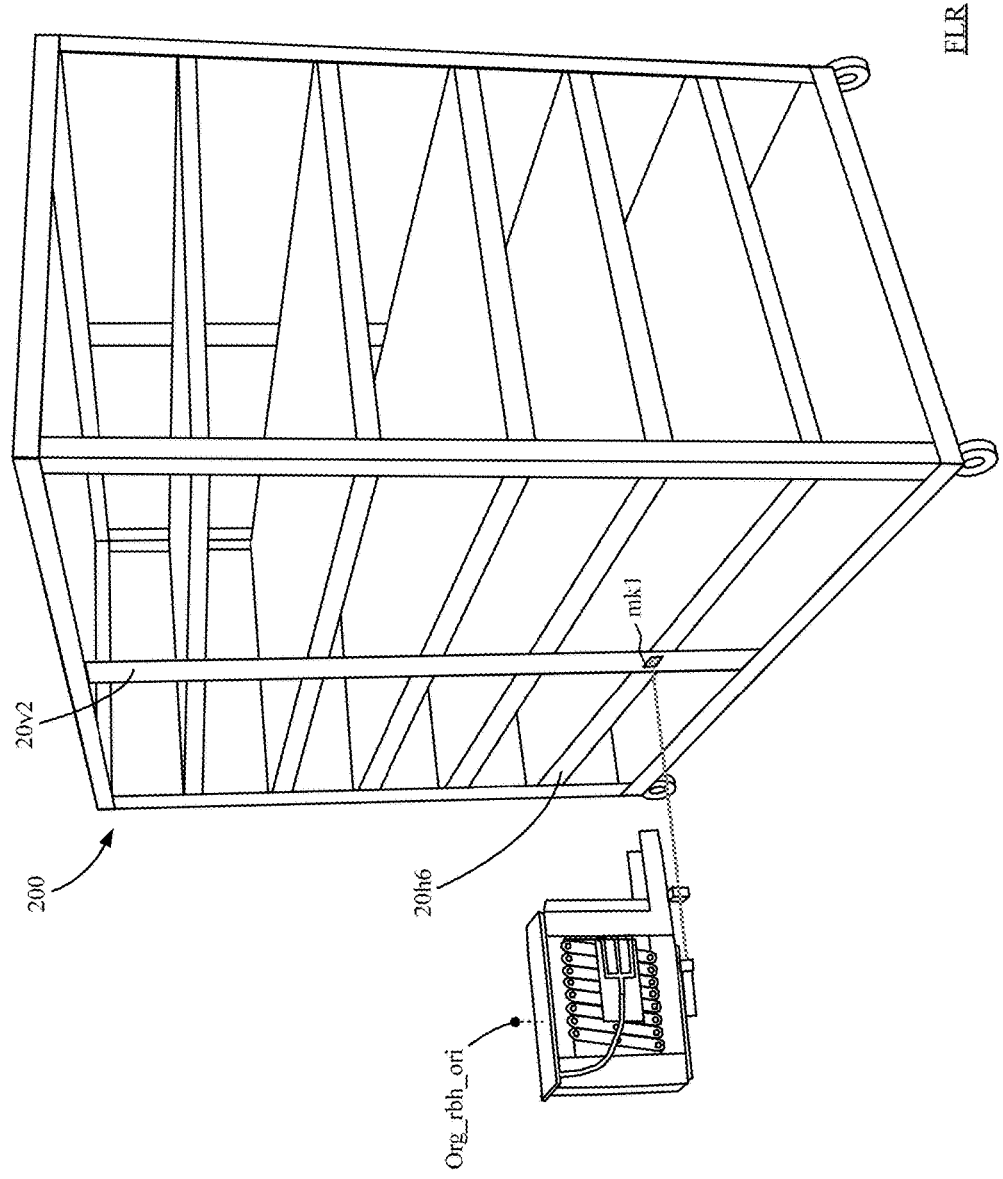
FIG. 18 is a diagram for explaining processing performed by the article conveyance processing system 1000.

In other words, as shown in FIG. 16, while performing attitude control of the robot hand 100 (while maintaining the attitude Ori(vec_$x_{rh}$, vec_$z_{rh}$)), the control unit 1 moves the robot hand 100 to a position where the laser beam emitted from the first distance sensor 13 of the robot hand 100 can be reflected by the distance measurement point on the horizontal frame 20$h$6, and the reflected light can be received by the first distance sensor 13, thereby allowing for measuring the distance between the measurement reference point of the first distance sensor 13 and the distance measurement point. The control unit 1 then measures the distance between the measurement reference point and the distance measurement point (the horizontal frame 20$h$6 of the mobile cart 200) by the first distance sensor 13. This measured value is referred as a distance dm2.

The control unit 1 then determines whether the difference between the measured distance values dm1 and dm2 for the above-described two points is within a predetermined range (within a predetermined error ε).

(1) When it is determined that the difference (=|dm1−dm2|) between the measured distance values dm1 and dm2 for the two points is not within a predetermined range (within a predetermined error ε), the straight line line.range-snsr1 connecting the measurement reference point of the first distance sensor 13 of the robot hand 100 and the distance measurement point at the time of the distance measurement is largely shifted with respect to the normal direction of the horizontal frame 20$h$6 of the mobile cart 200; and thus the attitude control of the robot hand 100 is performed again (in particular, the attitude control for rotating the robot hand 100 around the rotation axis r_ax6 (see FIG. 8A) is performed), and then the distances for the two points are measured. Note that this processing is repeatedly performed until the difference between the measured distance values dm1 and dm2 for the two points is within a predetermined range (within a predetermined error ε).

(2) In contrast, when it is determined that the difference (=|dm1−dm2|) between the measured distance values dm1 and dm2 for the two points is within the predetermined range (within the predetermined error ε), it is determined that the straight line line.range-snsr1 (the direction of the straight line line.range-snsr1 substantially coincides with the direction of the vector vec_$x_{rh}$ specifying the attitude of the robot hand 100) connecting the measurement reference point of the first distance sensor 13 of the robot hand 100 and the distance measurement point at the time of the distance measurement is substantially the same direction as the normal direction of the horizontal frame 20h6 of the mobile cart 200. The control unit 1 then sets (determines) the direction in which the robot hand 100 has been moved (the direction indicated by the direction DirH in FIG. 17) when the measured distance values dm1 and dm2 for the two points has been obtained as a direction of the horizontal axis of the cart coordinate system (the y-axis of the cart coordinate system). Note that the control unit 1 grasps (obtains) the position of the robot hand 100 when the measured distance values dm1 and dm2 for the two points are obtained using the robot coordinate system of the moving mechanism Rbt_arm (coordinate system for specifying the position when controlling (position-controlling) the moving mechanism Rbt_arm (robot arm Rbt_arm)); a vector that connects the coordinates of the position of the robot hand 100 when the measured distance value dm1 has been obtained and the coordinates of the position of the robot hand 100 when the measured distance value dm2 has been obtained is obtained (is calculated), thereby allowing for obtaining the direction (the direction indicated by the direction DirH in FIG. 17) in which the robot hand 100 has been moved when the measured distance values dm1 and dm2 for the above-described two points have been obtained.

Note that the attitude (orientation) of the robot hand 100 when the setting processing of the cart coordinate system y-axis (the processing of (2) above) has been completed is referred to as Ori(vec1_$x_{rh}$, vec1_$z_{rh}$). The vector vec1_$x_{rh}$ is a vector having the same direction as $x_{rh}$ axis of the orientation determination coordinate system of the robot hand 100 when the setting processing of the cart coordinate system y-axis (the process of (2)) has been completed.

Step S14:

In step S14, origin obtaining processing (processing of obtaining the coordinates of the robot coordinate system that corresponds to the origin of the cart coordinate system) is performed. Specifically, the following processing is performed.

The control unit 1 drives the moving mechanism Rbt_arm to move the robot hand 100 to a position where the optical axis (linear line range-camera) of the imaging unit 15 of the robot hand 100 passes over the identification information mark mk1 while controlling the attitude of the robot hand 100 (while maintaining the attitude Ori(vec1_$x_{rh}$, vec1_$z_{rh}$)). Further, the imaging parameter (focal length, angle of view, and the like) of the imaging unit 15 is adjusted (or the distance between the imaging unit 15 and the identification information mark mk1 is adjusted) so that the captured image by the imaging unit 15 is in focus on the identification information mark mk1 (a state in which the image is in focus) (for example, the state shown in FIG. 18).

Figure 19:
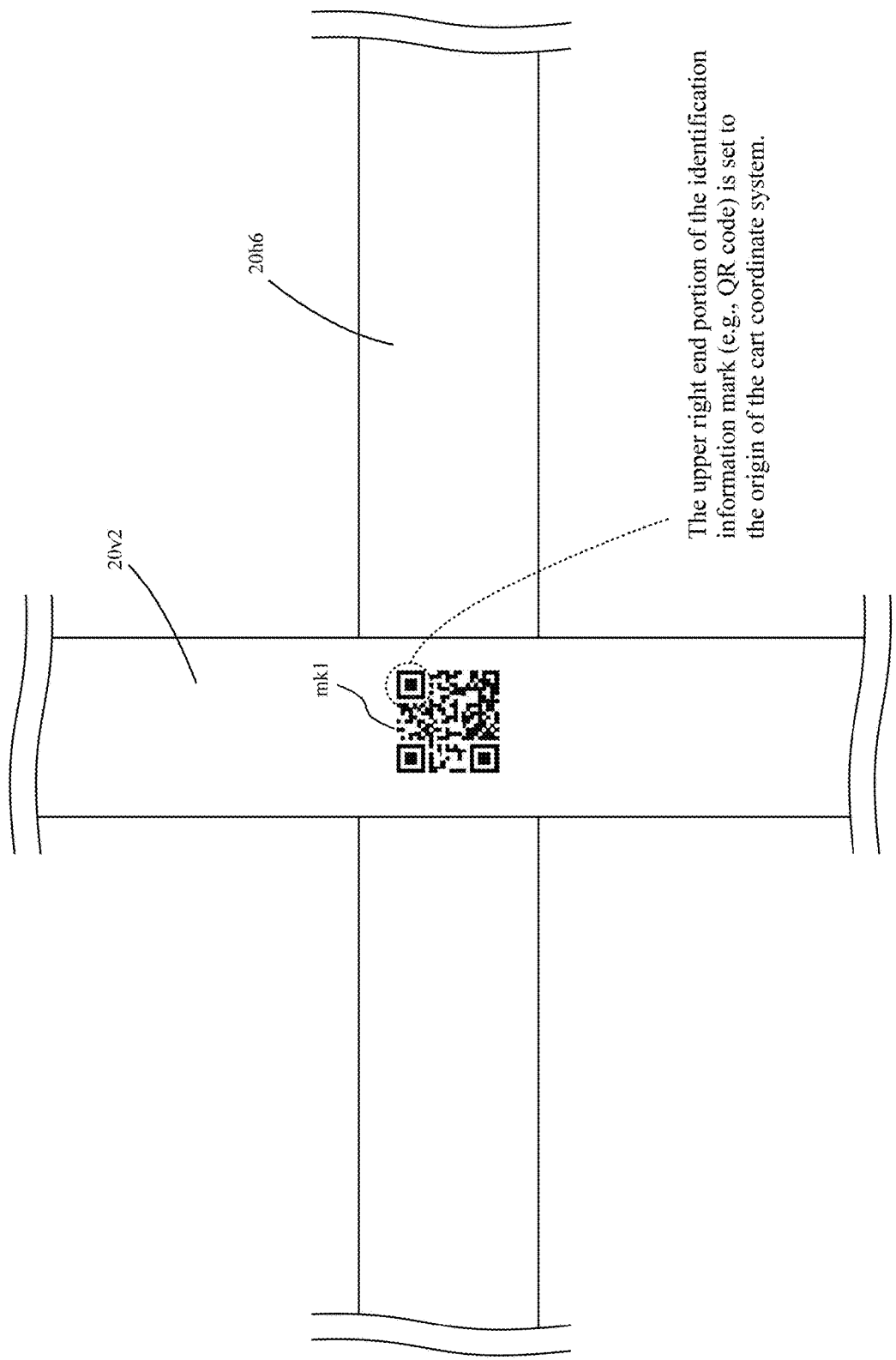
FIG. 19 is a diagram for explaining processing performed by the article conveyance processing system 1000.

After the above-described state has been set, the control unit 1 captures an image of the identification information mark mk1 by using the imaging unit 15, thereby obtaining the image of the identification information mark mk1. The control unit 1 then sets a predetermined position of the identification information mark mk1 to the origin of the cart coordinate system. For example, as shown in FIG. 19, when the identification information mark mk1 is a two-dimensional barcode, the control unit 1 sets the black square part at the upper right end of the two-dimensional barcode as the origin of the cart coordinate system. The control unit 1 grasps the imaging parameters of the imaging unit 15 in a state in which the captured image by the imaging unit 15 is in focus on the identification information mark mk1, and thus it is possible to obtain the coordinates in the robot coordinate system of the point that has been set as the origin of the cart coordinate system (in the case of FIG. 19, the black square part at the upper right end of the two-dimensional bar code). Note that the coordinates in the robot coordinate system of the point that has been set as the origin of the cart coordinate system (in the case of FIG. 19, the black square part at the upper right end of the two-dimensional bar code) are denoted as [xo$^{(rbt)}$, yo$^{(rbt)}$, zo$^{(rbt)}$]. "$^{(rbt)}$" indicates coordinates in the robot coordinate system.

Step S15:

In step S15, identification information mark reading processing is performed. Specifically, the following processing is performed.

The control unit 1 captures an image of the identification information mark mk1 by the imaging unit 15, and performs image processing on the captured image of the identification information mark mk1 to obtain information on the identification information mark mk1 (for example, when the identification information mark mk1 is a two-dimensional barcode, the two-dimensional barcode is read and information included in the two-dimensional barcode is obtained).

In the present embodiment, it is assumed that the identification information mark mk1 (for example, a two-dimensional bar code) includes information of a number for identifying a mobile cart.

The control unit 1 then obtains information of a number for identifying the mobile cart included in the identification information mark mk1.

In the storage unit Mem1 of the control device Dev1, a number for identifying a mobile cart and information associated with the number are stored in advance or it is obtained from the outside via the communication interface IF1 and stored therein. For example, the information associated with the number for identifying the mobile cart is as follows (an example).

(1) The size of the mobile cart (vertical length, horizontal length, height)
(2) The number of stages of the mobile cart (the number of shelves)
(3) Side A/Side B (information indicating whether the front surface (side A) or the back surface (side B) of the mobile cart)
(4) Coordinates of the upper left corner of the mobile cart (coordinates in the cart coordinate system)
(5) Arrangement position and arrangement pitch (arrangement interval) of each shelf Based on the obtained number for identifying the mobile cart, the control unit 1 reads out data associated with the number from the storage unit Mem1.

Step S16:

In step S16, processing of setting the vertical axis of the cart coordinate system (the z-axis of the cart coordinate system) is performed.

Figure 20:
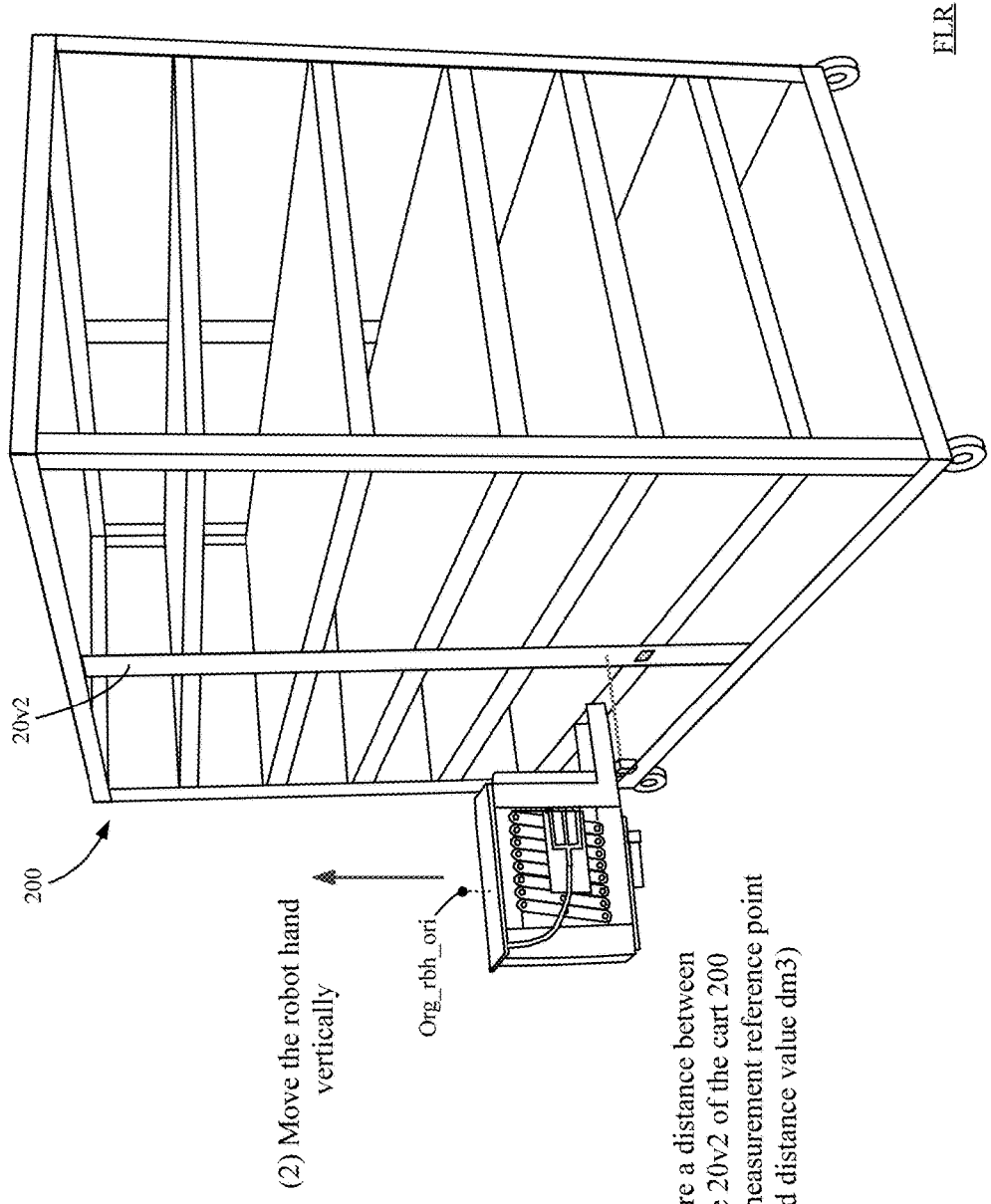
FIG. 20 is a diagram for explaining processing performed by the article conveyance processing system 1000.
Figure 21:
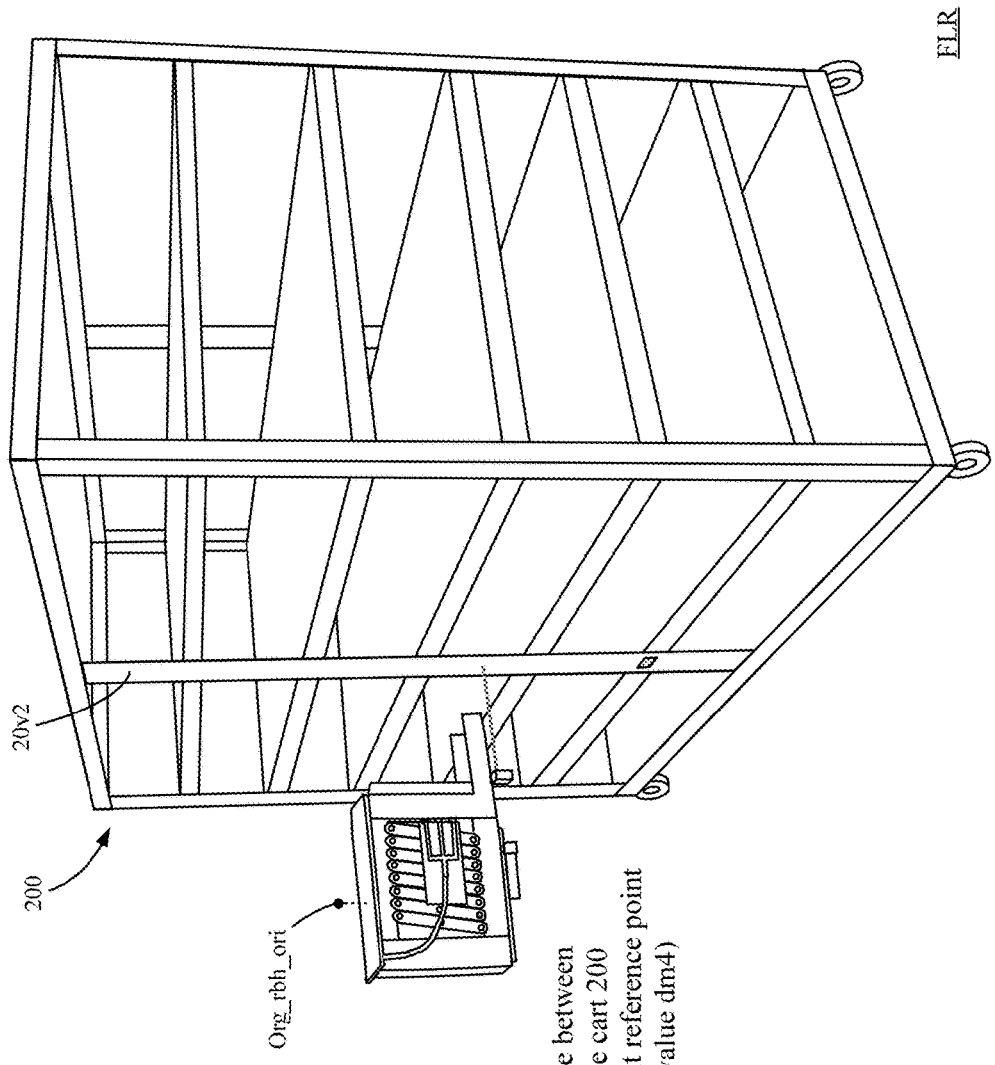
FIG. 21 is a diagram for explaining processing performed by the article conveyance processing system 1000.
Figure 22:
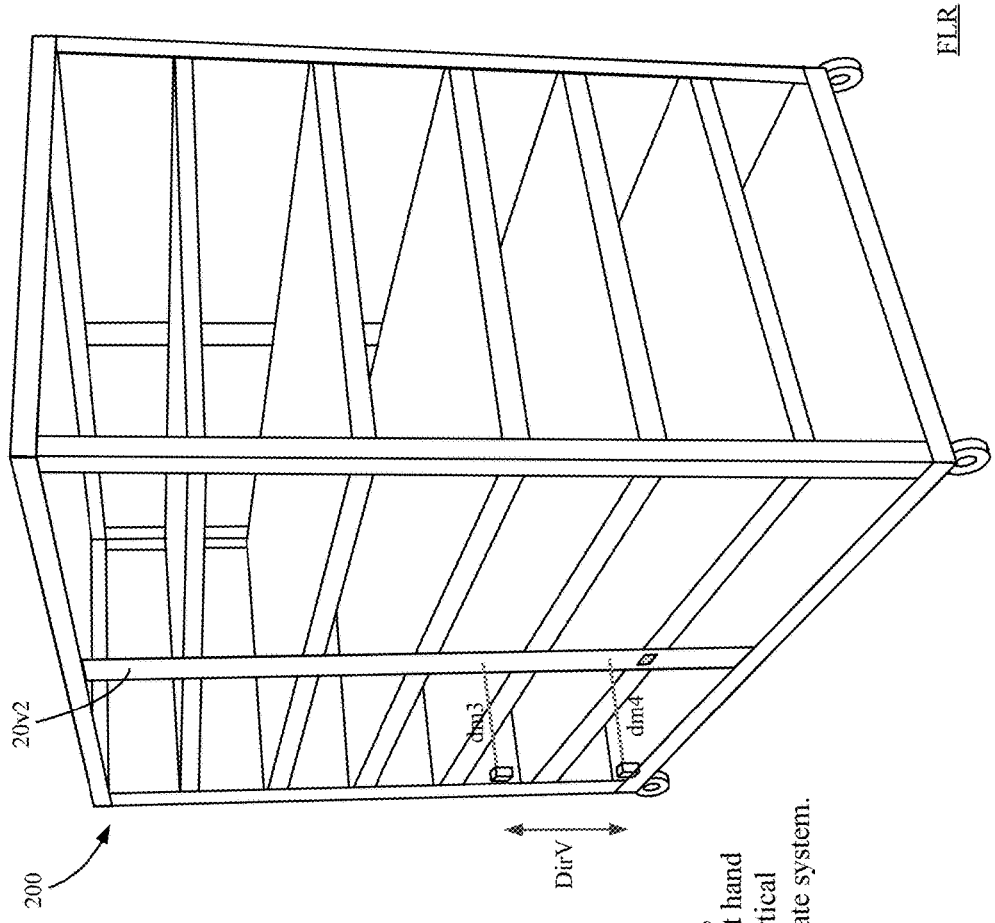
FIG. 22 is a diagram for explaining processing performed by the article conveyance processing system 1000.

The control unit 1 drives the moving mechanism Rbt_arm to move the robot hand 100 to a position where the distance measurement can be performed by the first distance sensor 13 of the robot hand 100 with two different points on the vertical frame 20v2 of the mobile cart 200 as distance measurement points with the identification information mark mk1 as the center between the two different points (see FIGS. 20 and 21). The specific processing will be described below.

First, as shown in FIG. 20, the control unit 1 drives the moving mechanism Rbt_arm to move the robot hand 100 to a position where distance measurement can be performed by the first distance sensor 13 of the robot hand 100 using a point on the vertical frame 20v2 as a distance measurement point while performing attitude control of the robot hand 100 (while maintaining the attitude Ori (vec1_$x_{rh}$, vec1_$z_{rh}$)). In other words, as shown in FIG. 20, while performing attitude control of the robot hand 100, the control unit 1 move the robot hand 100 to a position where the laser beam emitted from the first distance sensor 13 of the robot hand 100 is reflected by the distance measurement point on the vertical frame 20v2, the reflected beam is received by the first distance sensor 13, thereby allowing for measuring the distance between the measurement reference point of the first distance sensor 13 and the distance measurement point. The control unit 1 then measures the distance between the measurement reference point and the distance measurement point (the vertical frame 20v2 of the mobile cart 200) by the first distance sensor 13. In a case where the distance between the measurement reference point and the distance measurement point cannot be measured by the first distance sensor 13 of the robot hand 100, the control unit 1 may change the attitude of the robot hand 100 and perform control (attitude control) such that the distance between the measurement reference point and the distance measurement point can be measured by the first distance sensor 13.

The measured value of the distance between the measurement reference point and the distance measurement point measured by the first distance sensor 13 is referred to as a distance dm3, and the attitude (direction) of the robot hand 100 when the measured value is obtained is expressed as Ori(vec2_$x_{rh}$, vec2_$z_{rh}$) using the vector vec2_$x_{rh}$ (the vector vec2_$x_{rh}$ is a vector in the same direction as the $x_{rh}$ axis of the attitude determination coordinate system of the robot hand 100). Note that the attitude Ori(vec2_$x_{rh}$, vec2_$z_{rh}$) indicates an attitude (orientation) in which the $x_{rh}$ axis of the robot hand 100 coincides with the vector vec2_$x_{rh}$.

Next, the control unit 1 drives the moving mechanism Rbt_arm, sets another point on the vertical frame 20v2 as a distance measurement point, and moves the robot hand 100 to a position where the distance measurement can be performed by the first distance sensor 13 of the robot hand 100 while performing attitude control of the robot hand 100 (while maintaining the attitude Ori(vec2_$x_{rh}$, vec2_$z_{rh}$)) (for example, moves the robot hand 100 upward as shown in FIGS. 20 and 21).

In other words, as shown in FIG. 21, while performing attitude control of the robot hand 100 (while maintaining the attitude Ori(vec2_$x_{rh}$, vec2_$z_{rh}$)), the control unit 1 moves the robot hand 100 to a position where the laser beam emitted from the first distance sensor 13 of the robot hand 100 can be reflected by the distance measurement point on the vertical frame 20v2, and the reflected light can be received by the first distance sensor 13, thereby allowing for measuring the distance between the measurement reference point of the first distance sensor 13 and the distance measurement point. The control unit 1 then measures the distance between the measurement reference point and the distance measurement point (the vertical frame 20v2 of the mobile cart 200) by the first distance sensor 13. This measured value is referred to as a distance dm4.

The control unit 1 then determines whether the difference between the measured distance values dm3 and dm4 for the above-described two points is within a predetermined range (within a predetermined error ε).

(1) When it is determined that the difference (=|dm3−dm4|) between the measured distance values dm3 and dm4 for the two points is not within a predetermined range (within a predetermined error ε), the straight line line.range-snsr1 connecting the measurement reference point of the first distance sensor 13 of the robot hand 100 and the distance measurement point at the time of the distance measurement is largely shifted with respect to the normal direction of the vertical frame 20v2 of the mobile cart 200; and thus the attitude control of the robot hand 100 is performed again (in particular, the attitude control for rotating the robot hand 100 around the rotation axis r_ax5 (see FIG. 8A) is performed), and then the distances for the two points are measured. Note that this processing is repeatedly performed until the difference between the measured distance values dm3 and dm4 for the two points is within a predetermined range (within a predetermined error ε).

(2) In contrast, when it is determined that the difference (=|dm3−dm4|) between the measured distance values dm3 and dm4 for the two points is within the predetermined range (within the predetermined error ε), it is determined that the straight line line.range-snsr1 (the direction of the straight line line.range-snsr1 substantially coincides with the direction of the vector vec_$x_{rh}$ specifying the attitude of the robot hand 100) connecting the measurement reference point of the first distance sensor 13 of the robot hand 100 and the distance measurement point at the time of the distance measurement is substantially the same direction as the normal direction of the vertical frame 20v2 of the mobile cart 200. The control unit 1 then sets (determines) the direction in which the robot hand 100 has been moved (the direction indicated by the direction DirV in FIG. 22) when the measured distance values dm3 and dm4 for the two points has been obtained as a direction of the vertical axis of the cart coordinate system (the z-axis of the cart coordinate system). Note that the control unit 1 grasps (obtains) the position of the robot hand 100 when the measured distance values dm3 and dm4 for the two points are obtained using the robot coordinate system of the moving mechanism Rbt_arm (coordinate system for specifying the position when controlling (position-controlling) the moving mechanism Rbt_arm (robot arm Rbt_arm)); a vector that connects the coordinates of the position of the robot hand 100 when the measured distance value dm3 has been obtained and the coordinates of the position of the robot hand 100 when the measured distance value dm4 has been obtained is obtained (is calculated), thereby allowing for obtaining the direction (the direction indicated by the direction DirH in FIG. 17) in which the robot hand 100 has been moved when the measured distance values dm3 and dm4 for the above-described two points have been obtained.

Note that the attitude (orientation) of the robot hand 100 when the setting processing of the cart coordinate system y-axis (the processing of (2) above) has been completed is referred to as Ori(vec3_$x_{rh}$, vec3_$z_{rh}$). The vector vec3_$x_{rh}$ is a vector having the same direction as $x_{rh}$ axis of the orientation determination coordinate system of the robot hand 100 when the setting processing of the cart coordinate system y-axis (the processing of (2) above) has been completed. Further, processing of the step S13 is performed again with the attitude (orientation) Ori(vec3_$x_{rh}$, vec3_$z_{rh}$) of the robot hand 100 obtained in the step S16, and then it may be confirmed that the difference (=|dm1−dm2|) between the measured distance values dm1 and dm2 for the two points is within a predetermined range (within a predetermined error ε). When the difference (=|dm1−dm2|) between the measured distance values dm1 and dm2 for the two points is not within a predetermined range (within a predetermined error ε), the processing from the step S13 may be performed again.

Step S17:

In step S17, processing of setting a depth axis (x-axis of the cart coordinate system) of the cart coordinate system is performed.

The y-axis of the cart coordinate system has been set in the step S13, the z-axis of the cart coordinate system has been set in the step S16, and the y-axis and z-axis of the cart coordinate system are grasped; thus, the control unit 1 sets the direction (the normal direction of the y-z plane in the cart coordinate system) orthogonal to both the y-axis and z-axis of coordinate system as the direction of the depth axis of the cart coordinate system (x-axis of the cart coordinate system).

The control unit 1 then sets the origin obtained in the step S14 as the origin of the cart coordinate system (this is referred to as the origin $o^{(cart)}$). In other words, the control unit 1 sets the position $Po^{(rbt)} = [xo^{(rbt)}, yo^{(rbt)}, zo^{(rbt)}]$ of the robot coordinate system to the position of the origin $Po^{(cart)} = [0^{(cart)}, 0^{(cart)}, 0^{(cart)}]$ of the cart coordinate system ("$(rbt)$" indicates coordinates or a position vector of the robot coordinate system, and "(cart)" indicates coordinates or a position vector of the cart coordinate system).

Figure 23:
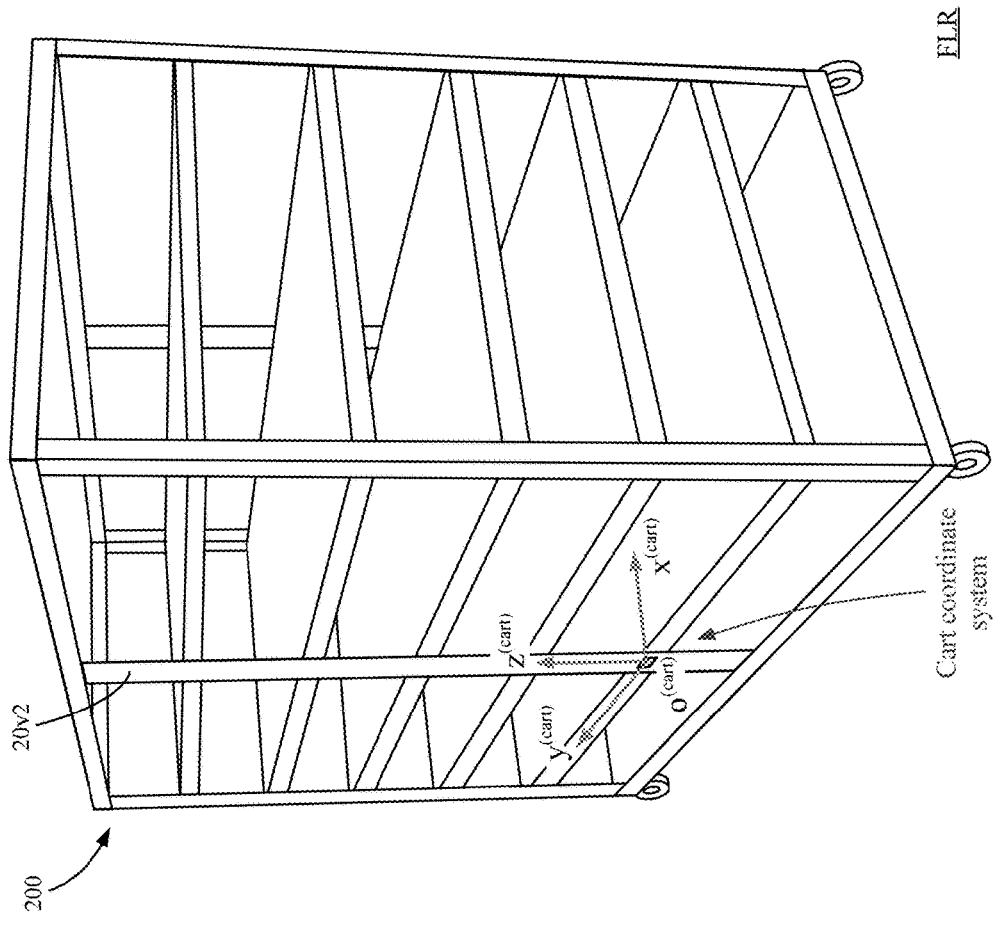
FIG. 23 is a diagram for explaining processing performed by the article conveyance processing system 1000.

Also, assuming that (1) a unit vector in the same direction as the direction of the y-axis of the cart coordinate system obtained in the step S13 is $ye^{(cart)}$, (2) a unit vector in the same direction of the direction of the z-axis of the cart coordinate system obtained in the step S16 is $ze^{(cart)}$, and (3) a unit vector in the same direction as the direction orthogonal to both the y-axis and z-axis of the cart coordinate system is $xe^{(cart)}$, the control unit 1 sets an origin to the point $o^{(cart)}$, and furthermore sets a coordinate system (three-dimensional coordinate system) whose basis vectors are the unit vector $xe^{(cart)}$ (vector (basis vector) that defines the x-axis of the cart coordinate system (this is referred to as the $x^{(cart)}$ axis)), the unit vector $ye^{(cart)}$ (vector (basis vector) that defines the y-axis of the cart coordinate system (this is referred to as the $y^{(cart)}$ axis)), and the unit vector $ze^{(cart)}$ (vector (basis vector) that defines the z-axis of the cart coordinate system (this is referred to as the $z^{(cart)}$ axis)). As a result, a cart coordinate system is set as shown in FIG. 23.

The control unit 1 then performs conversion (coordinate conversion) of a position vector (position coordinates) of the robot coordinate system and a position vector (position coordinates) of the cart coordinate system by performing processing corresponding to the following equation.

<When Converting the Cart Coordinate System to the Robot Coordinate System>

$$p^{(rbt)} = {}^{rbt}_{cart}T p^{(cart)} \qquad \text{Formula 1}$$

$p^{(rbt)}$: vector indicating a position in the robot coordinate system (position vector)

$R^{bt}_{cart}T$: matrix (affine transformation matrix) for converting a cart coordinate system into a robot coordinate system (4×4 matrix)

$p^{(cart)}$: vector indicating a position in the cart coordinate system (position vector)

$$p^{(rbt)} = [x^{(rbt)}, y^{(rbt)}, z^{(rbt)}, 1]^T$$

$$p^{(cart)} = [x^{(cart)}, y^{(cart)}, z^{(cart)}, 1]^T$$

<When Converting the Robot Coordinate System to the Cart Coordinate System>

$$p^{(cart)} = {}^{rbt}_{cart}T^{-1} p^{(rbt)} \qquad \text{Formula 2}$$

$p^{(rbt)}$: vector indicating a position in the robot coordinate system (position vector)

$r^{bt}_{cart}T^{-1}$: inverse matrix of affine transformation matrix rbtcartT (4×4 matrix)

$p^{(cart)}$: vector indicating a position in the cart coordinate system (position vector)

$$p^{(rbt)} = [x^{(rbt)}, y^{(rbt)}, z^{(rbt)}, 1]^T$$

$$p^{(cart)} = [x^{(cart)}, y^{(cart)}, z^{(cart)}, 1]^T$$

When both the robot coordinate system and the cart coordinate system are coordinate systems defined by normal orthonormal vectors, the affine transformation matrix may be a homogeneous transformation matrix.

Figure 24:
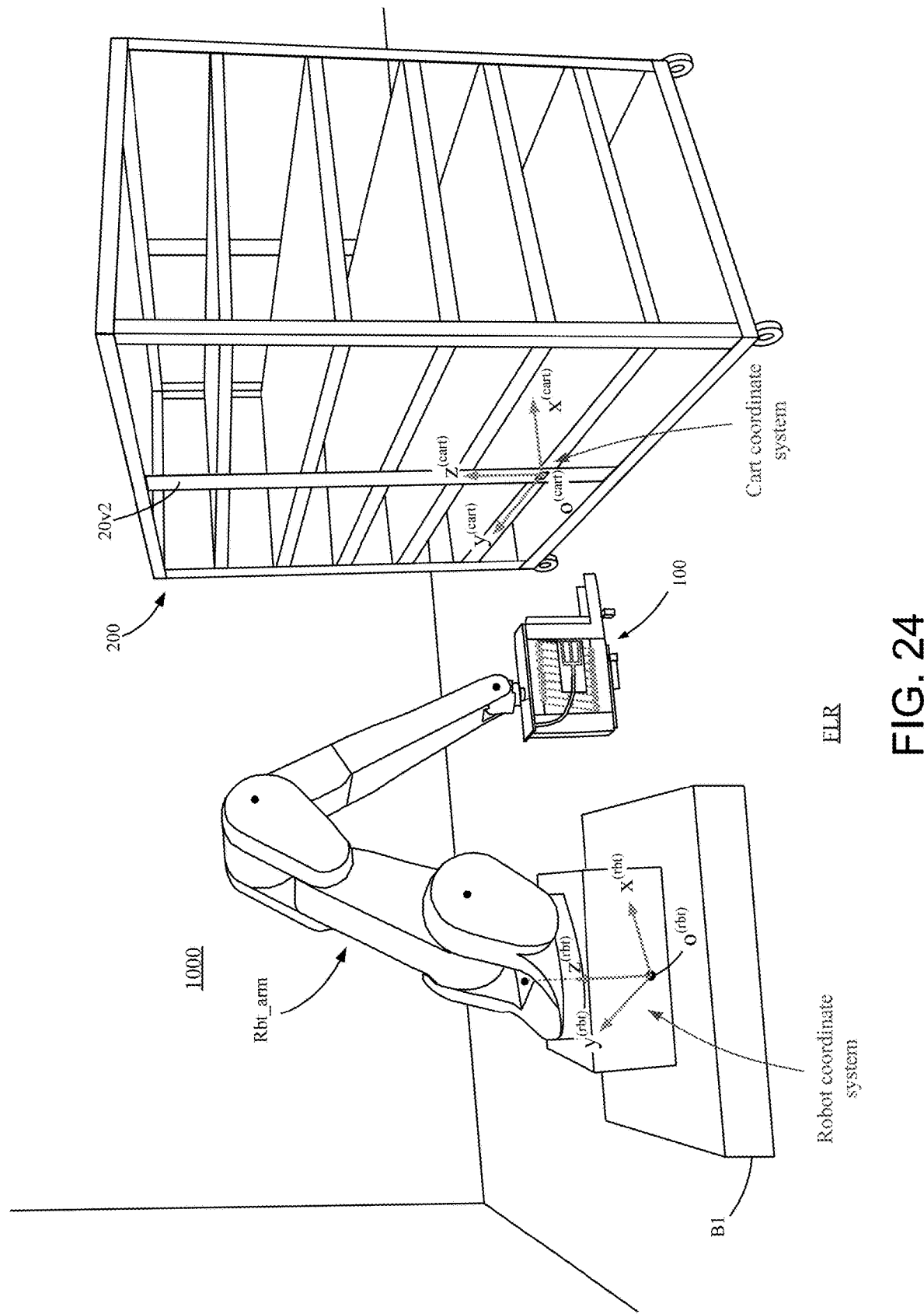
FIG. 24 is a diagram for explaining processing performed by the article conveyance processing system 1000.

As described above, the control unit 1 can perform processing (coordinate system conversion processing) of converting the position vector (position coordinates) of the robot coordinate system and the position vector (position coordinates) of the cart coordinate system, and can perform, for example, conversion processing (coordinate system conversion processing) of the robot coordinate system and the cart coordinate system as shown in FIG. 24.

In the manner described above, the cart coordinate system setting processing is performed.

Step S2:

In step S2, loop processing (loop 1) is started, and the loop processing (loop 1) is repeatedly performed as long as the condition of the loop processing is satisfied (for example, until a command to terminate the article conveyance processing is issued by the control unit 1).

Step S3:

In step S3, moving processing of the moving mechanism Rbt_arm is performed. For example, as shown in FIG. 25, when the cash box CB1 (an example of an article) placed in the innermost row of the top shelf of the mobile cart 200 is taken out, the control unit 1 reads out information associated with the number of the identification information mark attached to the frame of the mobile cart 200 from the storage unit Mem1 to obtain information described below.

(1) The size of the mobile cart 200 (vertical length, horizontal length, height)

(2) The number of stages of the mobile cart 200 (the number of shelves)

Figure 25:
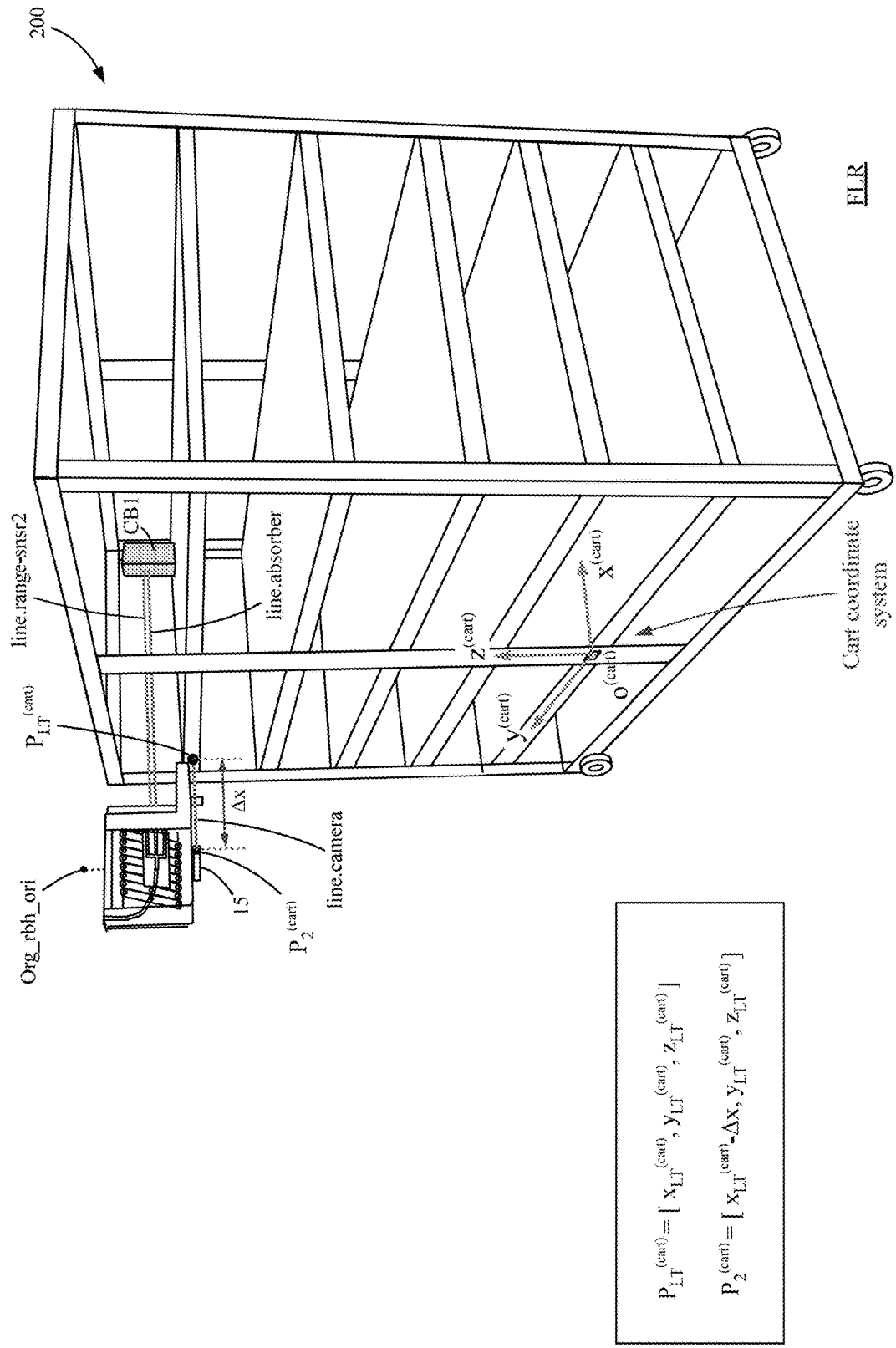
FIG. 25 is a diagram for explaining processing performed by the article conveyance processing system 1000.

(3) Side A/Side B (4) Coordinates of the upper left corner of the mobile cart (coordinates in the cart coordinate system) (e.g., information corresponding to a position vector of the point $P_{LT}^{(cart)}$ in the cart coordinate system shown in FIG. 25 (position for identifying the upper left column (first column at the top stage) where the cash boxes of the mobile cart 200 are arranged))

(5) Arrangement position and arrangement pitch (arrangement interval) of each shelf of the mobile cart 200

(6) Information on whether a mark indicating a substantially center position of each column when cash boxes are arranged and placed is attached to a horizontal frame of each shelf of the mobile cart 200

The control unit 1 obtains coordinates of the upper left end of the mobile cart 200 (position vector $P_{LT}^{(cart)} = [x_{LT}^{(cart)}, y_{LT}^{(cart)}, z_{LT}^{(cart)}]$) in the cart coordinate system; taking the above information into consideration, the control unit 1 expands the telescopic mechanism 11 and sucks the cash box CB1 to move the cash box to a position where it can be taken out. The specific processing will be described below. Note that a case where the position of the robot hand 100 is controlled based on the focal position of the imaging unit 15 (an example) will be described.

Figure 26A:
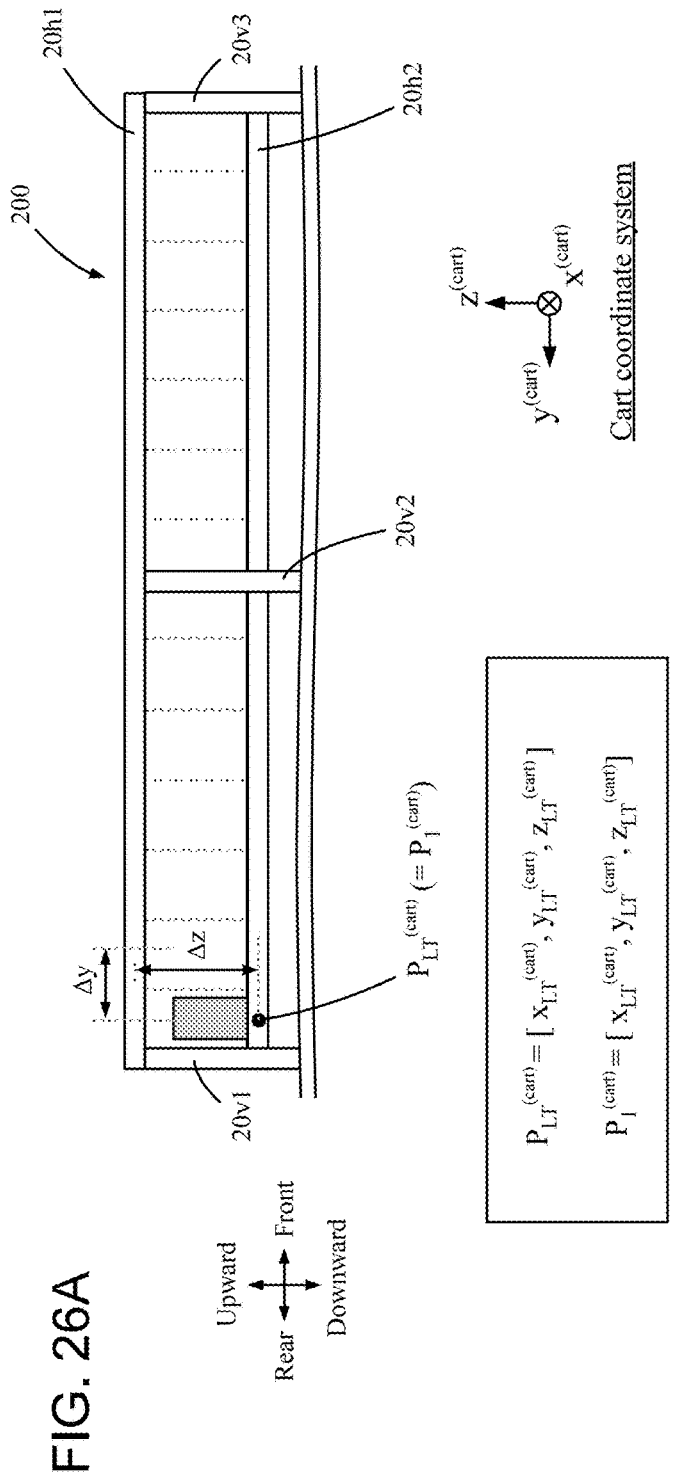
FIG. 26 is a diagram for explaining processing performed by the article conveyance processing system 1000.

The control unit 1 obtains information about the size (vertical length, horizontal length, and height) of the mobile cart 200, the number of stages (the number of shelves) of the mobile cart 200, the article arrangement positions of the shelves, and the arrangement pitch (arrangement interval), and thus can obtain a distance Δy between the columns of the cash box CB1 and a distance Δz between the shelves as shown in FIG. 26A.

Further, as shown in FIG. 25, the control unit 1 can obtain a distance Δx in the x-axis direction of the cart coordinate system from the point $P_{LT}^{(cart)}$ (=$P_1^{(cart)}$)(Information on the point $P_{LT}^{(cart)}$ is obtained from the information associated with the number for the identification information mark) to the focal position of the imaging unit 15 (the position indicated by the point $P_2^{(cart)}$ in FIG. 25).

Thus, the control unit 1 can specify a position (a position at which the focus of the imaging unit 15 of the robot hand 100 is a point $P_2^{(cart)}$) at which the imaging unit 15 can image the point $P_1^{(cart)}$ (a point on the vertical frame 20h2) ($P_1^{(cart)}=[x_{LT}^{(cart)}-\Delta x, y_{LT}^{(cart)}, z_{LT}^{(cart)}]$) with the in-focus condition for the point $P_1^{(cart)}$ in FIG. 26A (a condition where the point $P_1^{(cart)}$ is in focus).

The control unit 1 then sets $p^{(cart)}=[P_2^{(cart)}, 1]^T=[x_2^{(cart)}, y_2^{(cart)}, z_2^{(cart)}, 1]^T$, and performs coordinate conversion processing according to the Formula 1, thereby obtaining $p^{(rbt)}$ (=$[P_2^{(rbt)}, 1]^T=[x_2^{(rbt)}, y_2^{(rbt)}, z_2^{(rbt)}, 1]^T$) and furthermore obtaining the coordinates (position vector) $P_2^{(rbt)}$ (=$[x_2^{(rbt)}, y_2^{(rbt)}, z_2^{(rbt)}]$) in the robot coordinate system corresponding to the point $P_2^{(cart)}$ in the cart coordinate system. The control unit 1 then drives the moving mechanism Rbt_arm and moves the robot hand 100 to the coordinates (position vector) $P_2^{(rbt)}$ in the robot coordinate system, thereby allowing for moving the robot hand 100 to the point $P_2^{(cart)}$ in the cart coordinate system.

At this time, the control unit 1 performs attitude control of the robot hand 100 so that the attitude of the robot hand 100 becomes an attitude in which the $x_{rh}$ axis of the attitude determination coordinate system of the robot hand 100 coincides with the $x^{(cart)}$ axis of the cart coordinate system.

In this state, the control unit 1 takes an image of the vertical frame 20h2 (the vicinity of the point $P_1^{(cart)}$) of the mobile cart 200 by using the imaging unit 15.

Step S4:

In step S4, attitude fine adjustment processing of the moving mechanism Rbt_arm is performed. Specifically, the following processing is performed.

The control unit 1 analyzes the image of the horizontal frame 20h2 (the vicinity of the point $P_1^{(cart)}$) of the mobile cart 200 captured in the step S3, and determines whether the longitudinal direction of the horizontal frame 20h2 substantially coincides with the y-axis direction of the cart coordinate system. In a case when the longitudinal direction of the horizontal frame 20h2 is inclined by a predetermined angle or more with respect to the y-axis direction of the cart coordinate system, it may become difficult to cause the suction mechanism 12 to reach the cash box CB1 by linearly expanding the telescopic mechanism 11 of the robot hand 100 towards the cash box CB1 when the cash box CB1 is to be sucked and taken out by expanding the telescopic mechanism 11 of the robot hand 100.

Thus, when the longitudinal direction of the horizontal frame 20h2 is inclined by a predetermined angle or more with respect to the y-axis direction of the cart coordinate system, the control unit 1 controls the attitude of the robot hand 100 so that the longitudinal direction of the horizontal frame 20h2 substantially coincides with $y_{rh}$ axis of the attitude determination coordinate system of the robot hand 100, or adjusts the height of the placing flat plate 10LT of the robot hand 100 in accordance with the height in the longitudinal direction of the horizontal frame 20h2. This allows the robot hand to linearly reach the cash box CB1 by expanding the telescopic mechanism 11 of the robot hand 100 of the robot hand 100, thus making it possible to smoothly take out the cash box CB1.

Figure 26B:
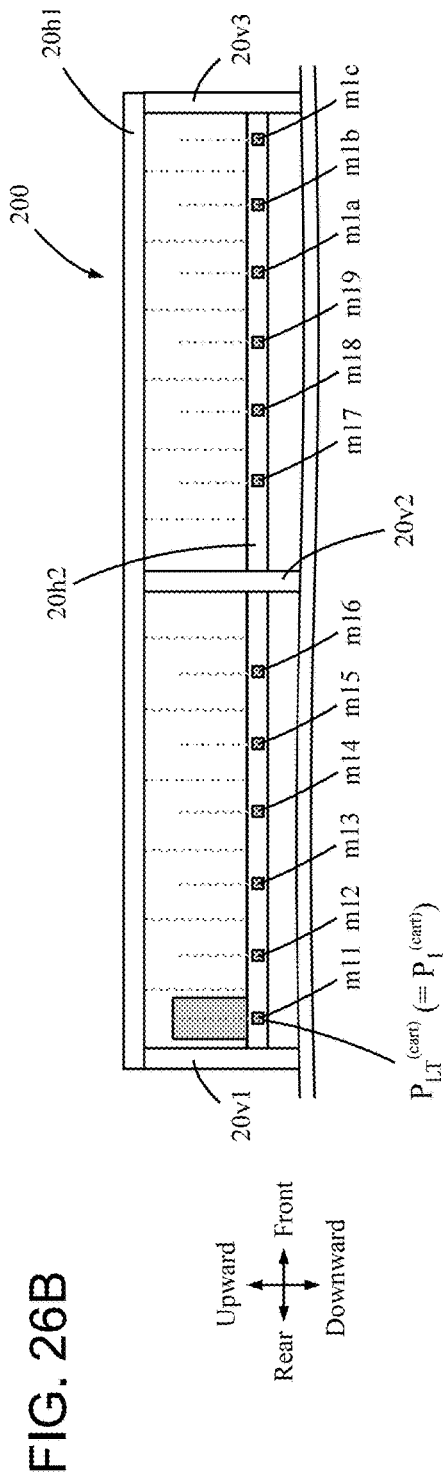

Note that, for example, as shown in FIG. 26B, in a case where the mobile cart 200 is a mobile cart in which marks m11 to m1c each indicating a substantially center position of each column in placing the cash box CB1 in an array are attached to a horizontal frame of each shelf, the position control (movement control), the attitude control, the fine adjustment of the attitude control, and the like of the robot hand 100 may be performed based on the positions of the marks m11 to m1c. In this case, the position control (movement control), the attitude control, the fine adjustment of the attitude control, and the like of the robot hand 100 can be performed based on the marks m11 to m1c on the horizontal frames of the individual shelves of the mobile cart 200, thus allowing for appropriately performing the position control (movement control) and the attitude control of the robot hand 100 even when the mobile cart 200 is deformed.

Step S5:

In step S5, article taking-out processing is performed. Specifically, the following processing is performed.

Figure 27:
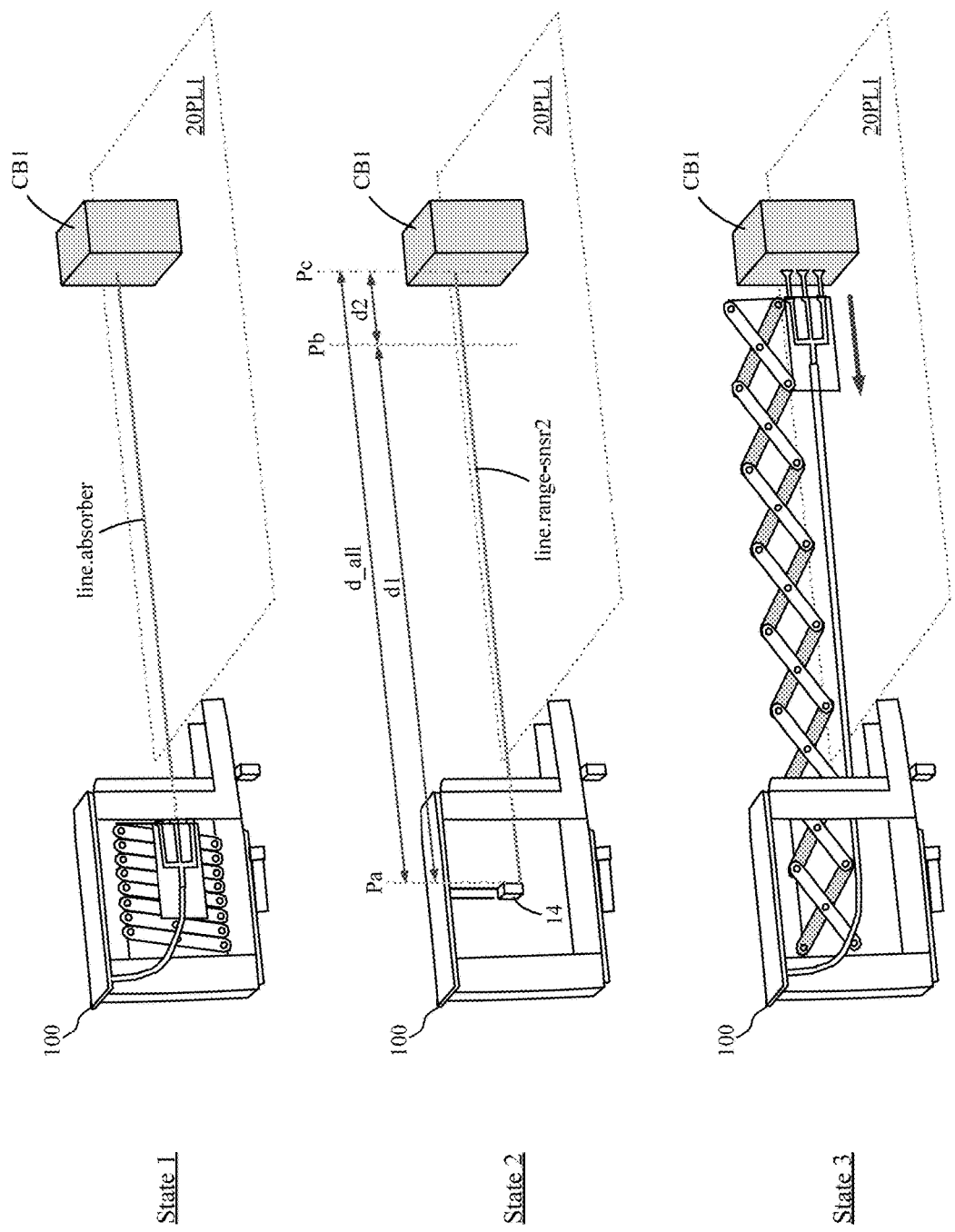
FIG. 27 is a diagram for explaining processing performed by the article conveyance processing system 1000.

When the processing in the step S4 has been completed, as shown in State 1 of FIG. 27, it is highly likely that the orientation (attitude) of the robot hand 100 substantially coincides with the normal direction of the front surface of the cash box CB1 closer to the robot hand 100. In other words, when the cash box CB1 is placed on the shelf of the mobile cart 200 in an aligned manner, the orientation (attitude) of the robot hand 100 is likely to substantially coincide with the normal direction of the front surface of the cash box CB1 closer to the robot hand 100.

As shown in State 2 of FIG. 27, the control unit 1 then measures the distance from the second distance sensor 14 to the surface of the robot hand 100 of the cash box CB1 closer to the robot hand 100 by using the second distance sensor 14. The second distance sensor 14 measures the distance from it to the measurement point on an approximate plane using the highly directional laser beam; thus, when the measurement value is obtained normally, it can be determined that the orientation (attitude) of the robot hand 100 substantially coincides with the normal direction of the surface of the cash box CB1 closer to the robot hand 100.

When the distance measurement has been normally performed by the second distance sensor 14, the control unit 1 sets a section defined by a position, whose distance is shorter than a distance d_all from the second distance sensor 14 to the cash box CB1 (the measured distance) by a distance d2, and the position of the cash box CB1 as a low-speed movement section (the section from Pb to Pc in FIG. 27), and further sets a section from a position (e.g., the position of the second distance sensor 14 (the position of Pa in FIG. 14)) of the robot hand 100 to a position in front of the position of the second distance sensor 14 by the distance d2 with respect to the surface of the cash box CB1 as a high-speed movement section (the section from Pa to Pb in FIG. 27).

The control unit 1 then drives and controls the telescopic mechanism 11 so that the suction mechanism 12 (suction portion 12S) reaches the front face of the cash box CB1 by expanding the telescopic mechanism 11. At this time, in the high-speed movement section set as described above, the control unit 1 sets a control method for driving the telescopic mechanism 11 as the position control method (the control method of the electric cylinder for driving the telescopic mechanism 11), and then performs control so that the suction mechanism 12 (the suction portion 12S) attached to the tip of the telescopic mechanism 11 moves at high speed.

When the control unit 1 determines that the suction mechanism 12 (suction portion 12S) at the front end of the telescopic mechanism 11 has entered the low-speed movement section beyond the high-speed movement section, the control unit sets the control method for driving the telescopic mechanism 11 to a pressing control method (sets a control method of an electric cylinder for driving telescopic mechanism 11 to a control method that monitors the pressure change of the suction portion 12S and stops the expansion operation of the telescopic mechanism 11 when it is determined that the suction portion 12S has sucked), and then controls the suction mechanism 12 (the suction portion 12S) attached to the tip of the telescopic mechanism 11 to move at low speed so that the suction state is reliably detected.

Figure 28:
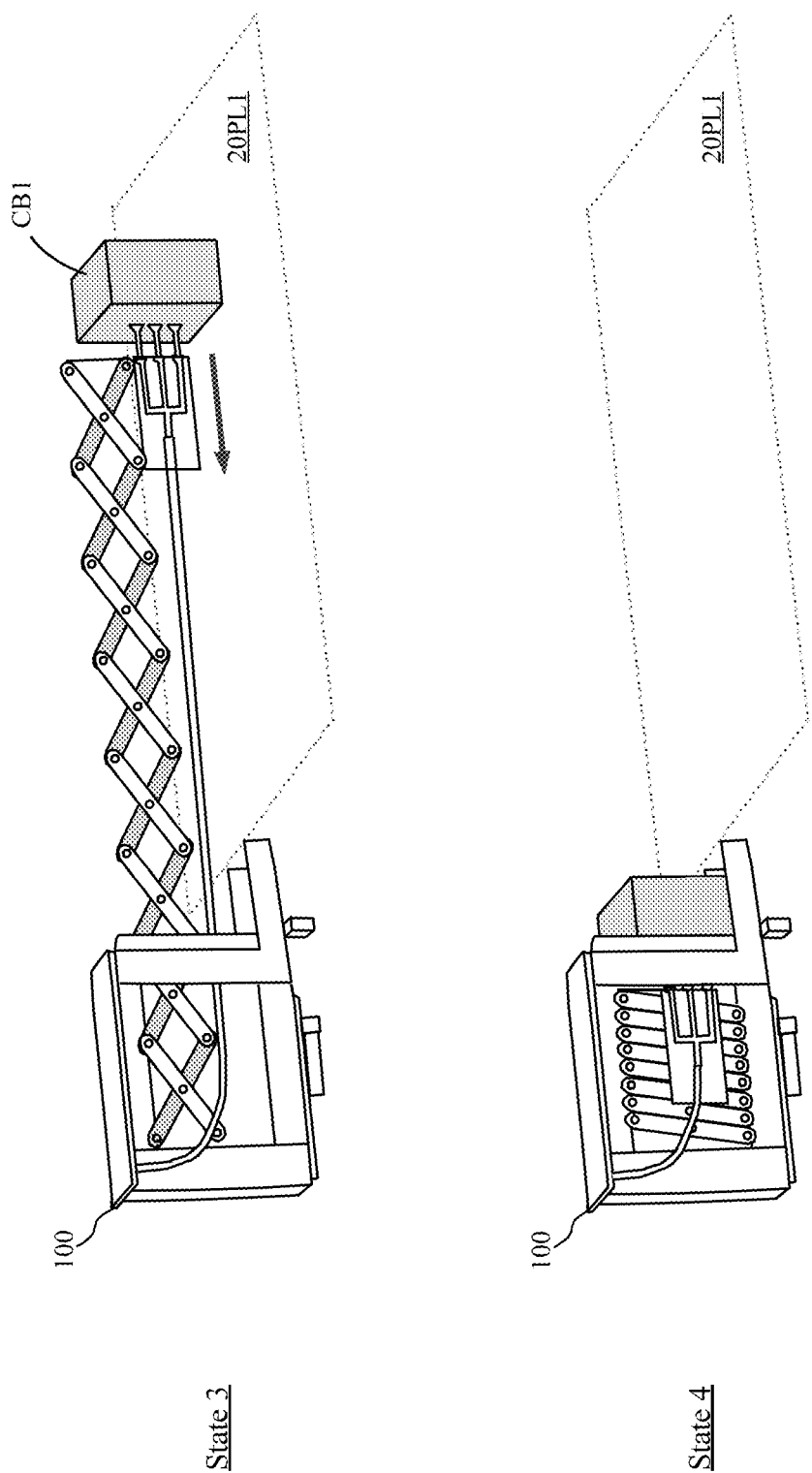
FIG. 28 is a diagram for explaining processing performed by the article conveyance processing system 1000.

When the suction mechanism 12 (suction portion 12S) at the tip of the telescopic mechanism 11 reaches the surface of the cash box CB1 and then a state in which the surface of the cash box CB1 has been adsorbed (State 3 in FIG. 27) is detected, the control unit 1 performs processing of contracting the telescopic mechanism 11 and pulling back the cash box CB1 to the robot hand 100 while maintaining the state in which the surface of the cash box CB1 has been adsorbed. As shown in the State 4 of FIG. 28, the control unit 1 confirms that the cash box CB1 has been placed on the placing portion 10Tr of the robot hand 100, and then completes the article taking-out processing.

Step S6:

In step S6, article conveyance processing is performed. In step S5, the control unit 1 controls the moving mechanism Rbt_arm so as to convey the cash box CB1 placed on the placing portion 10Tr of the robot hand 100 to a predetermined position. As a result, the cash box CB1 placed on the placing portion 10Tr of the robot hand 100 is conveyed to a predetermined position.

Step S7:

In step S7, it is determined whether the termination condition of the loop processing (loop 1) is satisfied; when the termination condition is satisfied, the article conveyance processing is terminated, whereas when the termination condition is not satisfied, the processing is returned to the step S2, and the processing of the steps S3 to S6 is performed.

For example, in the article conveyance processing system 1000, a case will be described in which an article (for example, a cash box) placed in an adjacent row of a row on which the cash box CB1 has been placed is to be taken out by using the robot hand 100, the adjacent row being on the same shelf of the mobile cart 200 where the cash box CB1 has been placed; in this case, when taking out the cash box CB1, the article conveyance processing system 1000 may control the robot hand 100 to be moved to a position of coordinates obtained by subtracting a predetermined value (e.g., $\Delta y1$ ($\Delta y1$ is a displacement amount in the y-axis direction of the cart coordinate system)) from the y coordinate of the position $P_1^{(cart)}(=[x_{LT}^{(cart)}-\Delta x, y_{LT}^{(cart)}, z_{LT}^{(cart)}]$ in the cart coordinate system.

Also, a case in which an article (e.g., a cash box) placed on a shelf one stage below the stage where the cash box CB1 has been placed in the mobile cart 200 is to be taken out will be described; in this case, when the cash box CB1 is taken out, control processing may be performed so that the robot hand 100 is moved to a position of coordinates obtained by subtracting a predetermined value (e.g., $\Delta z1$ ($\Delta z1$ is a displacement amount in the z-axis direction of the cart coordinate system)) from the z coordinate of the position $P_1^{(cart)}(=[x_{LT}^{(cart)}-\Delta x, y_{LT}^{(cart)}, z_{LT}^{(cart)}]$ in the cart coordinate system.

In other words, using the cart coordinate system obtained such that the vertical, horizontal, and depth axes of the cart coordinate system substantially coincide with the vertical, horizontal, and depth directions of the mobile cart 200, respectively, the article conveyance processing system 1000 can move the robot hand 100, and thus makes it possible to easily take out an article at a predetermined position of the mobile cart 200 or to easily convey an article to a predetermined position of the mobile cart 200. Further, based on the cart coordinate system obtained such that the vertical, horizontal, and depth axes of the cart coordinate system substantially coincide with the vertical, horizontal, and depth directions of the mobile cart 200, respectively, the article conveyance processing system 1000 can control the attitude of the robot hand 100, and thus makes it possible to accurately (reliably) take out an article placed on the shelf of the mobile cart 200 at high speed and to accurately (reliably) place an article at a predetermined position of the mobile cart 200 at high speed.

As described above, using the cart coordinate system obtained such that the vertical, horizontal, and depth axes of the cart coordinate system substantially coincide with the vertical, horizontal, and depth directions of the mobile cart 200, respectively, the article conveyance processing system 1000 performs the control of moving the robot hand 100 and the attitude control of the robot hand 100. Further, the article conveyance processing system 1000 determines the type, the configuration, and the like of the mobile cart based on the identification information mark attached to the mobile cart 200, and performs the control of moving the robot hand 100 and the attitude control of the robot hand 100 accordingly.

In the manner described above, using the cart coordinate system obtained such that the vertical, horizontal, and depth axes of the cart coordinate system substantially coincide with the vertical, horizontal, and depth directions of the mobile cart 200, respectively, the article conveyance processing system 1000 performs the control of moving the robot hand 100 and the attitude control of the robot hand 100; thus, the article conveyance processing system 1000 can efficiently take out an article from a shelf or the like (e.g., a mobile cart) and/or place an article on a shelf or the like (e.g., a mobile cart) regardless of in what orientation a wide variety of mobile carts are placed.

OTHER EMBODIMENTS

In the above embodiment, a case where the robot hand 100 includes two distance sensors (the first distance sensor 13 and the second distance sensor 14) in the article conveyance processing system 1000 has been described, but the present invention should not be limited thereto; the robot hand 100 may be provided with one distance sensor, and the distance sensor may perform the processing performed by the first distance sensor 13 and the second distance sensor 14.

Also, in the robot hand 100, the same distance sensor as the first distance sensor 13 may be attached to a position below the side surface of the second side L-shaped plate 10L2 of the robot hand 100 (a position symmetrical with respect to the placing flat plate 10LT across the placing flat plate 10LT), the distance to the horizontal frame of the mobile cart may be measured using the first distance sensor 13 and the newly attached distance sensor, and the attitude control of the robot hand 100 may be performed based on whether the measured distances of the two distance sensors are substantially the same.

In the above embodiment, a case where the moving mechanism Rbt_arm is a robot arm in the article conveyance processing system 1000 has been described, but the present invention should not be limited thereto; the moving mechanism Rbt_arm may be any other mechanism (moving mechanism) as long as it is capable of moving it in three-dimensional space and controlling the attitude.

In the above-described embodiment, the identification information mark mk1 in the article conveyance processing system 1000 stores only the number for identifying the mobile cart, but the present invention should not be limited thereto; for example, information stored in the storage unit Mem1 in association with the number for identifying the mobile cart in the above-described embodiment may be stored in the identification information mark mk1.

The terms "substantially the same" and "substantial parallel" used in the above embodiments intend to permit an error occurring when control or the like is executed using a target value (or a design value) of being the same or using a target of being the parallel, or also permit an error determined depending on the resolution of the apparatus, and "substantially the same" or "substantial parallel" can include a range that a person skilled in the art determines (or recognizes) as being the same or being parallel.

In some example(s) in the above embodiments, only relevant member(s), among the constituent members of the embodiments of the present invention, necessary for describing the present invention are simplified and shown. Thus, the above embodiment(s) may include any constituent member that is not shown in the above embodiment(s). Also, in the above embodiment(s) and/or drawing(s), the dimensions of the members may not be faithfully (strictly) identical to their actual dimensions, their actual dimension ratios, or the like. Thus, the dimension(s) and/or the dimension ratio(s) may be changed without departing from the scope and the spirit of the invention.

Each block (each functional unit) of the article conveyance processing system 1000 described in the above embodiment may be formed using a single chip with a semiconductor device, such as LSI, or some or all of the blocks of the article conveyance processing system 1000 may be formed using a single chip. Further, each block (each functional unit) of the article conveyance processing system 1000 described in the above embodiments may be implemented with a semiconductor device such as a plurality of LSIs.

Note that although the term LSI is used here, it may also be called IC, system LSI, super LSI, or ultra LSI depending on the degree of integration.

Further, the method of circuit integration should not be limited to LSI, and it may be implemented with a dedicated circuit or a general-purpose processor. A field programmable gate array (FPGA) that can be programmed after the LSI is manufactured, or a reconfigurable processor that can reconfigure connection and setting of circuit cells inside the LSI may be used.

Further, a part or all of the processing of each functional block of each of the above embodiments may be implemented with a program. A part or all of the processing of each functional block of each of the above-described embodiments is then performed by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

For example, when functional units of the above embodiment is achieved by using software, a predetermined hardware structure (the hardware structure including CPU(s) (or it may be GPU(s)), ROM, RAM, an input unit, an output unit, a communication unit, a storage unit (eg, a storage unit achieved by using HDD, SSD, or the like), a drive for external media or the like, each of which is connected to a bus) may be employed to achieve the functional units by using software.

When each functional unit of the above embodiment is achieved by using software, the software may be achieved by using a single computer having the hardware configuration described above, and may be achieved by using distributed processes using a plurality of computers.

The processes described in the above embodiment may not be performed in the order specified in the above embodiment. The order in which the processes are performed may be changed without departing from the scope and the spirit of the invention. Further, in the processing method in the above-described embodiment, some steps may be performed in parallel with other steps without departing from the scope and the spirit of the invention.

The present invention may also include a computer program enabling a computer to implement the method described in the above embodiment and a computer readable recording medium on which such a program is recorded. Examples of the computer readable recording medium include a flexible disk, a hard disk, a CD-ROM, an MO, a DVD, a DVD-ROM, a DVD-RAM, a large capacity DVD, a next-generation DVD, and a semiconductor memory.

The computer program should not be limited to one recorded on the recording medium, but may be transmitted via an electric communication line, a wireless or wired communication line, a network represented by the Internet, or the like.

The specific structures described in the above embodiment are mere examples of the present invention, and may be changed and modified variously without departing from the scope and the spirit of the invention.

REFERENCE SIGNS LIST 1000 article conveyance processing system
100 robot hand
Rbt_arm moving mechanism
1 control unit
11 telescopic mechanism
12 adsorption mechanism
13 first distance sensor
14 second distance sensor
15 imaging unit

The invention claimed is:

1. An article conveyance processing system for taking out an article from a mobile cart having a horizontal frame and a vertical frame and/or conveying and placing an article on the mobile cart, comprising:
　a robot hand that grips and conveys an article;
　a moving mechanism configured to perform attitude control and movement control for the robot hand; and a control unit that controls the robot hand and the moving mechanism, wherein the robot hand comprises:

a frame; and a telescopic mechanism, an adsorption mechanism, a first distance sensor, a second distance sensor, and an imaging unit that are installed in the frame, wherein the control unit performs:

a first distance obtaining step of measuring a distance between a first measurement point on a horizontal frame of the mobile cart and the first distance sensor by the first distance sensor in a state in which the robot hand is attitude-controlled to have a predetermined attitude with respect to the mobile cart, and obtaining the measured value as a first distance;

a second distance obtaining step of, in a state of controlling the attitude of the robot hand in the same attitude as the predetermined attitude, measuring a distance between the first measurement point on the horizontal frame of the mobile cart and a second measurement point different from the first measurement point, and obtaining the measured value as a second distance;

a horizontal error determination step of determining whether a difference between the first distance and the second distance is equal to or less than a predetermined value;

a cart coordinate system horizontal axis setting step of, when it is determined that the difference between the first distance and the second distance is equal to or less than a predetermined value in the horizontal error determination step, setting an axis in substantially the same direction as a vector from the position of the robot hand when the first distance has been measured to the position of the robot hand when the second distance has been measured as a horizontal axis of the cart coordinate system that is a coordinate system used as references when controlling the movement and/or attitude for the mobile cart by the robot hand; and a robot hand control step of controlling the robot hand based on the cart coordinate system.

2. The article conveyance processing system according to claim 1, wherein the control unit further performs:

a third distance obtaining step of measuring a distance between a third measurement point on the vertical frame of the mobile cart and the first distance sensor by the first distance sensor in a state in which the robot hand is attitude-controlled to have a predetermined attitude with respect to the mobile cart, and obtaining the measured value as a third distance;

a fourth distance obtaining step of measuring a distance between a fourth measurement point, which is different from the third measurement point, on the vertical frame of the mobile cart and the first distance sensor by the first distance sensor in a state of controlling the attitude of the robot hand in the same attitude as in the third distance obtaining step, and obtaining the measured value as a fourth distance;

a vertical error determination step of determining whether a difference between the third distance and the fourth distance is equal to or less than a predetermined value; and a cart coordinate system vertical axis setting step of, when it is determined that the difference between the third distance and the fourth distance is equal to or less than a predetermined value in the vertical error determination step, setting an axis in substantially the same direction as a vector from the position of the robot hand when the third distance has been measured to the position of the robot hand when the fourth distance has been measured as a vertical axis of the cart coordinate system that is a coordinate system used as references when controlling the movement and/or attitude for the mobile cart by the robot hand.

3. The article conveyance processing system according to claim 1, wherein the control unit further performs a cart coordinate system depth axis setting step of setting an axis in a direction substantially orthogonal to both of a horizontal axis and a vertical axis of the cart coordinate system as a depth axis of the cart coordinate system.

4. The article conveyance processing system according to claim 1, wherein the control unit analyzes a captured image of the identification information mark affixed on the vertical frame or the horizontal frame of the mobile cart, which has been obtained by imaging the identification information mark by the imaging unit, to obtain information included in the identification information mark.

5. The article conveyance processing system according to claim 1, wherein the control unit further performs a cart coordinate system origin setting step of setting a predetermined position of an identification information mark affixed on the vertical frame or the horizontal frame of the mobile cart to an origin of the cart coordinate system.

6. The article conveyance processing system according to claim 1, wherein the control unit further performs:

a movement step of, when an article is to be taken out from a predetermined shelf of the mobile cart or an article is to be placed, taking out the article from the predetermined shelf or moving the article to a position where the article can be taken out from the predetermined shelf or be placed using the robot hand while performing the attitude control of the robot hand;

a detecting step of analyzing a captured image of the vertical frame supporting the predetermined shelf, which has been obtained by imaging the vertical frame by the imaging unit moved to a predetermined position in the movement step, to detect an inclination of the horizontal frame; and an attitude adjustment step of, when the inclination of the horizontal frame is larger than a predetermined value, adjusting the attitude control of the robot hand so as to correct the inclination.

7. The article conveyance processing system according to claim 1, wherein the mobile cart has a reference mark, which is for specifying a center position when the article is to be placed in a row on the horizontal frame, for each row for arranging articles in a row, and wherein the control unit, based on the reference mark, moves the robot hand while performing the attitude control of the robot hand, thereby performing the robot hand control step.

8. The article conveyance processing system according to claim 1, wherein the control unit further performs:

a section setting step of, when an article is to be taken out from a predetermined shelf of the mobile cart, measuring a distance to the article by using the second distance sensor, and setting a high-speed movement section that is a section for controlling the suction mechanism attached to the telescopic mechanism to move at high speed, and a low-speed movement section that is a section for controlling the suction mechanism to move at low speed while monitoring a suction state of a suction portion of the suction mechanism attached to the telescopic mechanism; and a telescopic mechanism control step of controlling the telescopic mechanism so that the suction mechanism attached to the telescopic mechanism moves at high speed in the high-speed movement section set in the section setting step, and controlling the telescopic mechanism so that the suction mechanism moves at low speed while monitoring a suction state of the suction portion of the suction mechanism attached to the telescopic mechanism in the low-speed movement section set in the section setting step.

* * * * *